United States Patent
Zinevich

(10) Patent No.: US 9,882,668 B2
(45) Date of Patent: Jan. 30, 2018

(54) DETECTING LEAKAGE OF OFDM SIGNALS FROM AN HFC NETWORK

(71) Applicant: ARCOM DIGITAL, LLC, Syracuse, NY (US)

(72) Inventor: Victor M. Zinevich, Voronezh (RU)

(73) Assignee: ARCOM DIGITAL, LLC, Syracuse, NY (US)

( * ) Notice: Subject to any disclaimer, the term of this patent is extended or adjusted under 35 U.S.C. 154(b) by 329 days.

(21) Appl. No.: 14/855,643

(22) Filed: Sep. 16, 2015

(65) Prior Publication Data

US 2016/0087742 A1    Mar. 24, 2016

Related U.S. Application Data

(60) Provisional application No. 62/052,421, filed on Sep. 18, 2014.

(51) Int. Cl.
  *H04L 12/26*    (2006.01)
  *H04J 11/00*    (2006.01)
  (Continued)

(52) U.S. Cl.
  CPC .......... *H04J 11/0023* (2013.01); *H04B 3/542* (2013.01); *H04L 12/2801* (2013.01);
  (Continued)

(58) Field of Classification Search
  CPC .......... H04J 11/0023; H04J 2011/0096; H04N 21/6118; H04N 21/44209; H04N 21/4382;
  (Continued)

(56) References Cited

U.S. PATENT DOCUMENTS

| 4,072,899 A | 2/1978 | Shimp |
|---|---|---|
| 6,018,358 A | 1/2000 | Bush |

(Continued)

FOREIGN PATENT DOCUMENTS

| WO | WO2000013424 A1 | 3/2000 |
|---|---|---|
| WO | WO2013003301 A1 | 1/2013 |

OTHER PUBLICATIONS

Agilent Technologies, Flexible OFDM Signal Generation, Analysis and Troubleshooting, Aerospace and Defense Symposium 2011, Apr. 13, 2011, pp. 1-70 (pp. 44-65), Agilent Technologies, Santa Clara, CA; http://www.keysight.com/upload/cmc_upload/All/2_Flexible_OFDM_Signal_Generation_Analysis_and_Troubleshooting.pdf?cmpid=1-3660333773&cc=US&lc=eng.

(Continued)

*Primary Examiner* — Kenneth Lam
(74) *Attorney, Agent, or Firm* — Lawrence P. Trapani, Esq.

(57) ABSTRACT

Detection of OFDM signals leaking from an HFC network with CCAP architecture is presented. Leak detection includes creating signatures of the OFDM signals and using them in an adaptive coherent cross-correlation processing method. The signature is created at a server and then transmitted to a field leakage detector via a wireless network. The server constructs signatures based on modulation and other parameters of the OFDM signal. The detector adaptively selects valid signatures depending on the location of the detector. A cross-correlation receiver samples the OFDM leakage signal in synchronism with a GPS clock and an OFDM master clock at a CMTS. Capture of the OFDM leakage signal in the detector is synchronized with the symbol rate and timestamp of the OFMD signal to achieve time delay measurements of the leak signal at different (Continued)

locations of the detector. Then, the leak is located using known TDOA or network database methods.

16 Claims, 15 Drawing Sheets

(51) Int. Cl.
| | |
|---|---|
| H04L 27/26 | (2006.01) |
| H04B 3/54 | (2006.01) |
| H04L 12/28 | (2006.01) |
| H04N 21/2383 | (2011.01) |
| H04N 21/438 | (2011.01) |
| H04N 21/442 | (2011.01) |
| H04N 21/61 | (2011.01) |

(52) U.S. Cl.
CPC ..... *H04L 27/2663* (2013.01); *H04N 21/2383* (2013.01); *H04N 21/4382* (2013.01); *H04N 21/44209* (2013.01); *H04N 21/6118* (2013.01); H04J 2011/0096 (2013.01)

(58) Field of Classification Search
CPC ............ H04N 21/2383; H04L 12/2801; H04L 27/2663; H04B 3/542
See application file for complete search history.

(56) References Cited

U.S. PATENT DOCUMENTS

| | | | |
|---|---|---|---|
| 6,600,515 | B2 | 7/2003 | Bowyer et al. |
| 6,804,826 | B1 | 10/2004 | Bush et al. |
| 7,250,772 | B2 | 7/2007 | Furse et al. |
| 7,415,367 | B2 | 8/2008 | Williams |
| 7,548,201 | B2 * | 6/2009 | Eckenroth ............ G01R 31/083 342/418 |
| 7,664,187 | B2 | 2/2010 | Chan et al. |
| 8,233,862 | B2 | 7/2012 | Gaddam et al. |
| 8,456,530 | B2 | 6/2013 | Zinevich |
| 8,605,806 | B2 | 12/2013 | Krishnan et al. |
| 8,749,248 | B2 | 6/2014 | Murphy et al. |
| 8,856,850 | B2 | 10/2014 | Sala et al. |
| 8,867,561 | B2 | 10/2014 | Urban et al. |
| 8,904,460 | B2 | 12/2014 | Zinevich |
| 9,106,886 | B2 | 8/2015 | Bush et al. |
| 9,112,762 | B2 | 8/2015 | Murphy |
| 9,160,407 | B2 | 10/2015 | Stelle, IV |
| 9,167,460 | B2 | 10/2015 | Bernard et al. |
| 9,374,291 | B2 | 6/2016 | Murphy |
| 2002/0101918 | A1 | 8/2002 | Rodman et al. |
| 2005/0034170 | A1 | 2/2005 | Bush et al. |
| 2006/0094943 | A1 | 5/2006 | Van Slyke |
| 2008/0220723 | A1 | 9/2008 | Krishnamoorthi et al. |
| 2009/0316634 | A1 | 12/2009 | Sahara |
| 2011/0243214 | A1 * | 10/2011 | Wolcott ............ H04L 25/03019 375/232 |
| 2011/0267474 | A1 * | 11/2011 | Sala ....................... H04N 17/00 348/180 |
| 2012/0042213 | A1 | 2/2012 | Zimmerman |
| 2012/0086865 | A1 | 4/2012 | Bush et al. |
| 2012/0257661 | A1 | 10/2012 | Murphy et al. |
| 2013/0291044 | A1 | 10/2013 | Zinevich |
| 2013/0322569 | A1 | 12/2013 | Murphy et al. |
| 2014/0036975 | A1 | 2/2014 | Wolcott et al. |
| 2014/0105251 | A1 | 4/2014 | Bouchard |
| 2014/0146864 | A1 | 5/2014 | Stelle et al. |
| 2014/0254407 | A1 | 9/2014 | Williams |
| 2014/0294052 | A1 | 10/2014 | Currivan et al. |
| 2015/0003226 | A1 | 1/2015 | Bernard et al. |
| 2015/0029869 | A1 * | 1/2015 | Wolcott ................... H04L 43/50 370/242 |
| 2015/0341810 | A1 | 11/2015 | Murphy |
| 2015/0381468 | A1 | 12/2015 | Murphy |
| 2016/0036492 | A1 | 2/2016 | Williams et al. |

OTHER PUBLICATIONS

European Patent Office, International Search Report on counterpart PCT Application No. PCT/US2015/050568, Pub. No. WO2016/044518 (dated Mar. 24, 2016), entitled Detecting Leakage of OFDM Signals from an HFC Network, date of ISR Jan. 8, 2016, pp. 1-4, published by World Intellectual Property Organization (WIPO), Geneva, Switzerland.

European Patent Office, Written Opinion of International Searching Authority, on counterpart PCT Application No. PCT/US2015/050568, Pub. No. WO2016/044518 (dated Mar. 24, 2016), entitled Detecting Leakage of OFDM Signals from an HFC Network, date of Written Opinion Jan. 8, 2016, pp. 1-8, published by World Intellectual Property Organization (WIPO), Geneva, Switzerland.

Shi, Zhenguo, et al., Improved Spectrum Sensing for OFDM Cognitive Radio in the Presence of Timing Offset, EURASIP Journal on Wireless Communications and Networking, Dec. 19, 2014, pp. 1-9, 2014:224, Springer, Germany/London.

Cable Television Laboratories, Inc. (CABLELABS®), Data-Over-Cable Service Interface Specifications DOCSIS® 3.1, Physical Layer Specification, CM-SP-PHYv3.1-I03-140610, Oct. 23, 2013 & Jun. 10, 2014, pp. 116-119, 134, 143-145, 158-162, 166-169, & 182-186, Rev.103, CableLabs®, Louisville, CO.

Tripathi, Monika, Study of Spectrum Sensing Techniques for OFDM-Based Cognitive Radio, Recent Trends in Electronics & Communication Systems, Jan. 1, 2014, pp. 25-31 (pp. 28 & 30), vol. 1, Issue I, STM Journals, India.

Lu, Lu, et al., Ten Years of Research in Spectrum Sensing and Sharing in Cognitive Radio, EURASIP Journal on Wireless Communications and Networking, Jan. 31, 2012, pp. 1-16, 2012:28, Springer, Germany/London.

Bokharaiee, Simin et al., Blind Spectrum Sensing for OFDM-Based Cognitive Radio Systems, IEEE Transactions on Vehicular Technology, Mar. 2011, pp. 858-871, vol. 60, No. 3, New York, NY.

Akyildiz, Ian F., et al., Cooperative Spectrum Sensing in Cognitive Radio Networks: A Survey, Physical Communication, Dec. 19, 2010, pp. 40-62 (pp. 40-43 & 46), vol. 4, Issue 1, Mar. 2011, Elsevier, BV, Amsterdam, Netherlands.

Yucek, Tevfik et al., A Survey of Spectrum Sensing Algorithms for Cognitive Radio Applications, IEEE Communications Surveys & Tutorials, Jan. 1, 2009, pp. 116-130, vol. 11, No. 1, First Quarter 2009, New York, NY.

* cited by examiner

PLC PREAMBLE BPSK MATRIX FOR 4K FFT MODE:

|  | Symbol 1 | Symbol 2 | Symbol 3 | Symbol 4 | Symbol 5 | Symbol 6 | Symbol 7 | Symbol 8 |
|---|---|---|---|---|---|---|---|---|
| Subcarrier 1 | 0 | 0 | 1 | 0 | 1 | 1 | 0 | 1 |
| Subcarrier 2 | 1 | 0 | 0 | 0 | 1 | 1 | 1 | 0 |
| Subcarrier 3 | 0 | 1 | 1 | 1 | 1 | 0 | 0 | 1 |
| Subcarrier 4 | 0 | 1 | 0 | 0 | 0 | 1 | 1 | 0 |
| Subcarrier 5 | 1 | 1 | 1 | 0 | 1 | 1 | 1 | 1 |
| Subcarrier 6 | 1 | 0 | 0 | 0 | 0 | 0 | 0 | 1 |
| Subcarrier 7 | 0 | 1 | 0 | 1 | 0 | 0 | 1 | 1 |
| Subcarrier 8 | 0 | 0 | 1 | 0 | 0 | 0 | 1 | 1 |

PLC PREAMBLE BPSK MATRIX FOR 8K FFT MODE:

|  | Symbol 1 | Symbol 2 | Symbol 3 | Symbol 4 | Symbol 5 | Symbol 6 | Symbol 7 | Symbol 8 |
|---|---|---|---|---|---|---|---|---|
| Subcarrier 1 | 1 | 0 | 0 | 1 | 0 | 1 | 0 | 0 |
| Subcarrier 2 | 0 | 1 | 1 | 0 | 0 | 1 | 0 | 0 |
| Subcarrier 3 | 0 | 1 | 1 | 1 | 0 | 0 | 0 | 1 |
| Subcarrier 4 | 0 | 0 | 0 | 1 | 0 | 1 | 1 | 1 |
| Subcarrier 5 | 1 | 1 | 0 | 0 | 1 | 0 | 1 | 0 |
| Subcarrier 6 | 0 | 0 | 0 | 1 | 1 | 0 | 0 | 1 |
| Subcarrier 7 | 0 | 1 | 1 | 1 | 0 | 1 | 1 | 0 |
| Subcarrier 8 | 1 | 1 | 1 | 0 | 0 | 0 | 1 | 0 |
| Subcarrier 9 | 0 | 1 | 1 | 1 | 1 | 0 | 0 | 1 |
| Subcarrier 10 | 1 | 1 | 1 | 1 | 0 | 1 | 1 | 1 |
| Subcarrier 11 | 1 | 1 | 1 | 0 | 0 | 0 | 0 | 0 |
| Subcarrier 12 | 1 | 1 | 0 | 1 | 0 | 1 | 0 | 1 |
| Subcarrier 13 | 1 | 1 | 0 | 0 | 1 | 1 | 0 | 0 |
| Subcarrier 14 | 1 | 0 | 1 | 1 | 1 | 0 | 1 | 0 |
| Subcarrier 15 | 0 | 1 | 0 | 1 | 1 | 0 | 0 | 0 |
| Subcarrier 16 | 0 | 0 | 1 | 0 | 0 | 0 | 0 | 1 |

AUTO-CORRELATION FUNCTION:

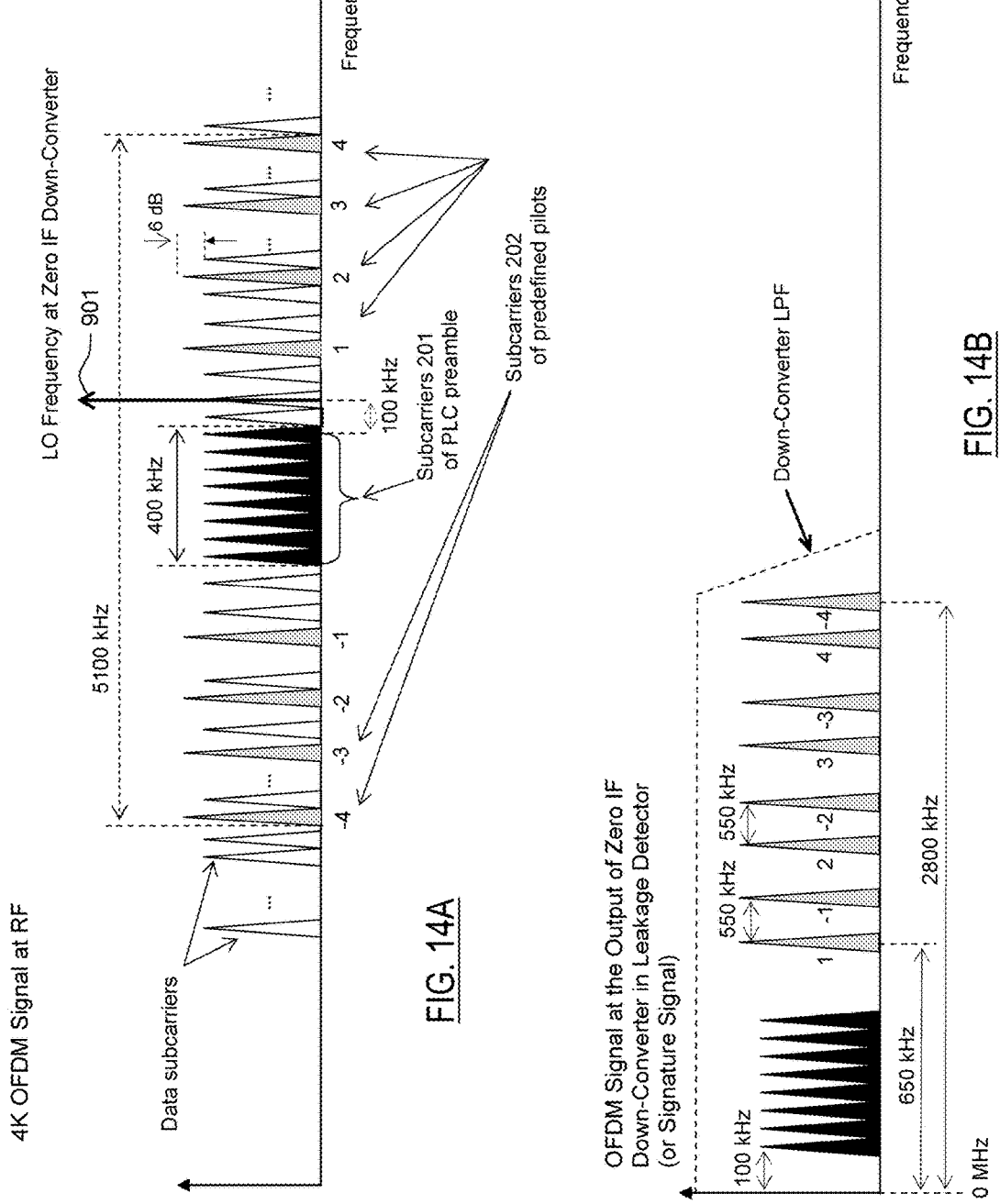

DETECTING LEAKAGE OF OFDM SIGNALS FROM AN HFC NETWORK

CROSS-REFERENCE TO RELATED APPLICATIONS

This application claims the benefit of U.S. Provisional Application No. 62/052,421, filed Sep. 18, 2014.

BACKGROUND OF THE INVENTION

Field of Invention

The present invention relates generally to the detection of signal leakage from a Hybrid Fiber-Coax (HFC) network, and more particularly to a method and system for detecting leakage of orthogonal frequency division multiplexing (OFDM) signals and locating the source of the leak in a modern HFC network having a Converged Cable Access Platform (CCAP) architecture.

Background Art

The task of detecting leakage from a coaxial cable part of an HFC network is important for preventing interfering signals emitted from the HFC network ("egress") at aeronautical and LTE bands and also for preventing interfering signals from entering the HFC network ("ingress"). The leakage detection in a modem HFC network with a CCAP architecture presents challenges, primarily because of two factors. The first is the aggressive migration from analog to digital signals, such as QAM signals. A QAM signal looks like noise, which creates difficulties in detecting this type of signal by traditional, narrowband analog leakage detectors. Another type of digital signal, introduced under the Data-Over-Cable Service Interface Specifications (DOCSIS) 3.1 specification, published by Cable Television Laboratories, Inc. (CableLabs®) of Louisville, Colo., is a wideband (up to 192 MHz) OFDM signal. The OFDM signal also looks like noise and its detection, e.g., by a sensitive spectrum analyzer, is even more complicated than a QAM signal, because the OFDM signal does not have a 6 MHz haystack spectrum shape (as does the QAM signal).

The second factor making leakage detection in a modern HFC network a challenge is the structure and operation of the CCAP architecture being adopted for such networks. There are many aspects of CCAP architectures, but, from the point of view of detecting RF leakage, the focus is on the aspect of increasing the number of narrowcast channels (SDV, VOD, DOCSIS, etc.) and forming a full spectrum of downstream channels at a single RF port of a Cable Modem Termination System (CMTS) card, for only a group of nodes or even a single node. In other words, the RF signal spectrum is becoming more unique at each node or group of nodes and this presents greater difficulties for valid detection of RF leakage throughout the HFC network.

The known methods of detecting leakage of digital signals in an HFC network can be divided into three main groups. The first group includes the traditional spectrum analyzer method. This method is universal for detection of any RF signal, but it is not sensitive enough for noise-like, low level QAM and OFDM signals, and there is the difficulty in identifying the particular HFC network (e.g., in an overbuilt scenario) from which the leaked signal came. Also, the cost of such equipment can be relatively high. Further, this method requires a human operator for analysis of the signals. Thus, it is not suitable for an automatic patrolling mode of leakage detection.

The second group of leakage detection methods is based on the injection into the HFC network of some predefined pilot or test signal with specific tag information modulated thereon (i.e., "tag signal"). This group has been well-known for many years and was widely used for detecting leakage of analog signals. Examples of this group are found in the following patents: U.S. Pat. No. 6,600,515 to Bowyer et al.; and U.S. Pat. No. 4,072,899 to Shimp. The use of tag or pilot signals in connection with analog TV signals are disclosed in the following patents: U.S. Pat. No. 6,804,826 to Bush et al.; U.S. Pat. No. 6,600,515 to Bowyer et al.; and U.S. Pat. No. 6,018,358 to Bush. These patents are primarily concerned with analog leakage signal detection, but can be used for digital leakage detection if an unoccupied channel or gap in the HFC spectrum is allocated for the tag or pilot signal (preferably near a digital channel). So, in general, the use of tag and pilot signals in an HFC network is well-known in RF engineering practice.

The first publication, to the Inventor's knowledge, of the idea of injecting a CW pilot carrier into a guard band between two adjacent QAM channels in an all-digital HFC network is a Polish Patent App. No. P.391095, filed Apr. 29, 2010 and a corresponding U.S. Pub. Patent App. No. 2011/0267474 (Nov. 3, 2011), filed Dec. 15, 2010 (by KABELKOM SP.). Similar concepts are also disclosed in the following patent documents: U.S. Pat. No. 8,749,248 (Jun. 10, 2014); and PCT Pub. App. WO 2013003301 (Jan. 3, 2013). In some disclosed embodiments, two CW carriers with a frequency off-set therebetween are used as a composite tag signal.

Another variant of injecting a pilot signal between adjacent QAM channels uses a spread spectrum BPSK modulated pilot signal placed in the guard bands between the QAM channels. This system is described in U.S. Pub. Patent App. 2014/0105251 (Apr. 17. 2014). Using a spread spectrum pilot purportedly makes the detection of the pilot signal more robust. However, the spread spectrum receiver used to accomplish the detection is more complex than a simple FFT receiver used to detect CW pilots in the other solutions.

The main disadvantage of all of the above pilot signal methods is that extra signals must be injected into the HFC network. So, there is a potential risk of the pilot signals interfering with the network's normal commercial signal traffic. In the case of using OFDM signals in an HFC network, the injection of any additional pilot signals may have an impact on the efficiency of data transmission. Also, in a modern HFC network with a CCAP architecture, physically combining any pilot signal with the downstream spectrum, formed at one RF port of a CMTS card for one or small group of nodes, is not trivial and may not even be possible, especially in the case of Fiber Deep systems proposed by Aurora Networks, Santa Clara, Calif. (www.aurora.com).

A third approach to detecting digital signal leakage is based on a coherent cross-correlation method described in U.S. Pat. No. 8,456,530, issued to the Inventor herein. A commercial embodiment of such a method is supplied by ARCOM DIGITAL, LLC, Syracuse, N.Y., under the brand name QAM Snare®. This method is based on the steps: (1) sampling the downstream digital signals at the headend under synchronization of a stable global positioning system (GPS) clock; (2) transmitting those samples to a field leakage detector via a wireless IP network; and (3) coherently cross-correlating those samples with samples of a received over-the-air leakage signal. The leakage signal is detected under noisy conditions from a cross-correlation peak resulting from the cross-correlation. The advantage of this method is that there is no need to inject a tag or pilot signal into the HFC network. Also, this method works and is compatible with any noise-like digital signal, such as a QAM or OFDM signal.

Another advantage of the coherent cross-correlation method is that it allows one to measure the time delay of the QAM or OFDM signal from the headend to the leakage detector, and then to use this time delay to determine a location of the leak in the HFC network. The location may be determined by using a Time Difference of Arrival (TDOA) algorithm or predetermined time delays of network devices in the HFC network under test, where the time delays are stored in a network database ("network database method"). Again, refer to the Inventor's earlier patent, U.S. Pat. No. 8,456,530, which is incorporated herein by reference. A limitation (in some circumstances) of the coherent cross-correlation method is that equipment for sampling the downstream digital signal is installed at the headend (or other suitable reference point in the network), and that such a method is most suited for detecting leakage of broadcast channel signals. As indicated above, a trend in modern HFC networks with a CCAP architecture is to reduce the number of broadcast channels, and the adoption of wideband OFDM signals may exacerbate the problem. Because OFDM modulation is more robust than QAM signals in the face of network impairments in the forward path, and due to better efficiencies in data transmission, it is likely that OFDM signals will gradually displace the current QAM channels signals in HFC networks and occupy the forward path spectrum more and more.

A non-coherent cross-correlation method for detecting leakage of a QAM signal has been proposed in U.S. Pub. Patent App. 2013/0322569 (Dec. 5, 2013). The QAM signal is detected by detecting a spectral component of a received signal that corresponds to a known QAM symbol rate used in the HFC network under test. It is believed that this approach is akin to detecting QAM leakage signals using a spectrum analyzer. This approach does not measure time delay between the leak and the leak detector and thus cannot take advantage of algorithms utilizing time delay data to locate the leak, such as the TDOA algorithm disclosed in U.S. Pat. No. 8,456,530.

A potential problem inherent to known cross-correlation methods is that a physical connection to a large number of RF ports at multiple CMTS's (in a CCAP architecture), for sampling the downstream OFDM signals, may become increasingly difficult, and it may even become impossible with a migration of CCAP to a Fiber Deep architecture. Another potential problem with known cross-correlation methods is that they may require a continuous wireless connection for transmission of reference signal samples from the headend (or other reference point) to the leakage detector in the field. There are still places where wireless communication is not reliable.

In light of the above discussion, it becomes clear that modern HFC networks employing CCAP architecture and transmitting OFDM signals present new challenges to cable operators in detecting and locating leakage of HFC network signals. It should be noted that challenges associated with detecting OFDM signals also exists in "Cognitive radio" and "Spectrum sensing" wireless communication systems. Using those terms in a Google® search will yield a number of articles, books, patents, and other references on this subject. But, it is believed that such references concern detection of OFDM signals for wireless communication applications and do not take into account the specifics of an OFDM signal leaking from a coaxial cable part of an HFC network with CCAP architecture. Thus, the known methods of detecting OFDM signals are not directly applicable to solving the above-discussed problems with modern HFC networks employing a CCAP architecture and transmitting OFDM signals.

OBJECTS AND SUMMARY OF THE INVENTION

It is therefore an object of the present invention to provide a method and system for detecting leakage of OFDM signals in an HFC network with a CCAP architecture that overcomes the problems associated with the prior art.

It is another object of the present invention to provide a cross-correlation method of detecting leakage of OFDM signals based on predetermined signatures of the OFDM signals, so that sampling of OFDM signals at the headend (or other point) and transmitting OFDM signal samples, via a continuous wireless connection, to a field leakage detector is not required.

It is further object of the present invention to provide a method of creating a signature of an OFDM signal based on modulation and other parameters of the OFDM signal.

It is still another object of the present invention to provide a method of selecting a signature for cross-correlation with leakage signal samples for leakage detection, based on the CMTS-serviced area in which the leakage detector is currently located.

It is still a further object of the present invention to provide a method of measuring time delay of OFDM leakage signals, which allows use of a TDOA algorithm or a network database method to locate leakage sources.

It is yet another object of the present invention to provide a system for detecting leakage of OFDM signals in an HFC network with CCAP architecture, including a leakage data server connected to the Internet and to a number of CMTS's via SNMP protocol, a field-deployable cross-correlation detector unit having a wireless modem for IP communication with the data server, and a GPS time sync module for location and to synchronize with a master clock of the OFDM signals at the CMTS's.

These and other objects are attained in accordance with the present invention, wherein there are provided methods and apparatus for detection of OFDM signals leaking from a modern HFC network having a CCAP architecture. Leak detection is based on creating signatures of the OFDM signals and using them in an adaptive coherent cross-correlation processing method. A signature for detection of an OFDM signal includes PLC and pilot subcarriers of the OFDM signal. The signature is constructed or calculated at a leakage data server and then transmitted to a field leakage detector via an IP wireless network. The server calculates signatures based on modulation and other parameters of the OFDM signal, periodically pulled from the CMTS's via SNMP protocol. The field detector unit adaptively selects valid signatures depending on the current location of the unit (as determined by GPS) and information about the boundaries or locations of predefined areas (e.g., hubs and nodes) served by the different CMTS's. A leakage receiver samples the OFDM leakage signal in synchronism with a GPS reference clock and an OFDM master clock at a CMTS, in accordance with IEEE's Precision Time Protocol or PTP/IEEE1588. Reference samples from the selected signature and the leakage signal samples are coherently cross-correlated to produce a correlation peak, which indicates detection and level of the leakage signal. The position of the correlation peak indicates a time delay associated with the leakage signal, which may be used, along with similar time delays measured at different locations of the leakage detector, to locate the leak. In this regard, the leak may be located using known TDOA algorithms or the network database method.

One embodiment of a method of detecting and locating a leak of an OFDM signal, comprises the steps of: (a) retrieving, from each CMTS serving a service area in an HFC network, signal parameters of an OFDM signal formed at the CMTS and transmitted from the CMTS to the service area; (b) constructing a signature, including a set of reference samples, of the OFDM signal formed at each CMTS, from the signal parameters retrieved in step (a); (c) storing a set of geographic coordinates of each service area served by a CMTS; (d) moving a leakage detector through the HFC network, along a route that traverses the service areas served by the CMTS's; (e) obtaining a geographic position of the leakage detector (GPS coordinates) as it moves along the route, and determining the service area in which the leakage detector is located based on the geographic position of the detector and the geographic coordinates of the service areas; (f) selecting a signature that is associated with the service area determined in step (e); (g) receiving an RF OFDM leakage signal leaked from the service area determined in step (e), down-converting the RF leakage signal to a baseband leakage signal, and generating samples of the baseband leakage signal; (h) cross-correlating samples of the baseband leakage signal with reference samples of the signature selected in step (f), to produce a cross-correlation function having a peak; (i) determining whether an OFDM leakage signal has been detected based on the peak of the cross-correlation function; (j) if a leakage signal has been detected, then determining the level of the leakage signal from the peak; (k) if the leakage signal has been detected, then determining a time delay associated with the leakage signal from the position of the peak in the cross-correlation function; and (l) determining a location in the service area where the RF OFDM leakage signal leaked, using the time delay determined in step (k).

BRIEF DESCRIPTION OF THE DRAWING

Further objects of the present invention will become apparent from the following description of a preferred embodiment with reference to the accompanying drawing, in which:

FIG. 14A is a frequency spectrum representation of an RF OFDM signal, in the 4K FFT mode, illustrating subcarriers of the signal and a specification of an LO carrier frequency for use in down-converting the OFDM signal in the digital cross-correlation leakage receiver;

FIG. 14B is a frequency spectrum representation of the down-converted OFDM signal, in the 4K FFT mode, illustrating the baseband placement of the PLC subcarriers and the predefined continuous pilot subcarriers;

DETAILED DESCRIPTION OF THE PREFERRED EMBODIMENT

Figure 1:
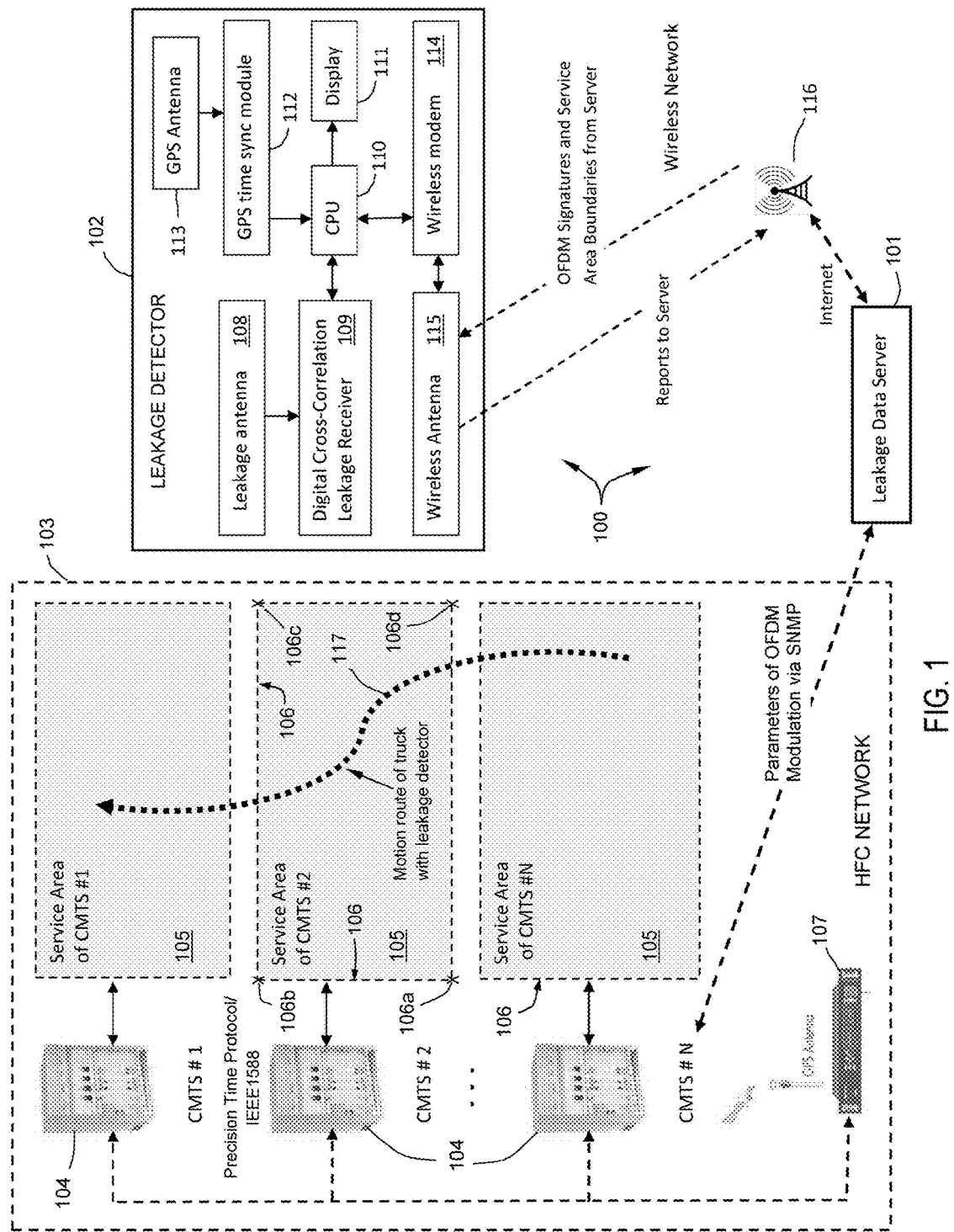
FIG. 1 is block diagram of a system of the present invention, along with its operational environment, for detecting leakage of an OFDM signal from a HFC network with a CCAP architecture.

An exemplary embodiment of a system 100 for detecting leakage of OFDM signals from an HFC network 103 is illustrated in the block diagram of FIG. 1. HFC network 103 is configured in accordance with a CCAP architecture. System 100 includes a leakage data server 101 and a field leakage detector unit 102. HFC network 103 includes N CMTS's 104, serving different service areas 105 of a coaxial cable portion of network 103. In general, a service area 105 may include a single hub or multiple hubs, a single node or a group of nodes, or other network subdivision or subsystem. Each service area 105 is defined by boundaries 106, which are defined by a set of corner points 106a-106d having geographic coordinates (e.g., longitude and latitude). Boundaries 106 and corner points 106a-106d are typically very accurate due to widely used electronic GIS maps in modern HFC networks. Also, HFC network 103 includes a Precision Time Protocol (PTP) grandmaster server 107, for accurate time synchronization of all CMTS's 104, according to the PTP/IEEE1588 specification. Grandmaster server 107 generates a GPS synchronized 10.24 MHz clock and 1 pulse per second (1PPS) signal. The time synced signals are used as a reference at all CMTS's 104 for time synchronization via the PTP/IEEE1588 specification. Therefore, all CMTS's form the same timestamps and 10.24 MHz master clock, which are used to form an OFDM signal according to the DOCSIS 3.1 specification. This means that OFDM signals, formed by different CMTS's 104 are synchronized from a common UPS clock. This is different from the case of forming QAM signals, where no strong time synchronization exists between different QAM modulators. The abovementioned aspects of forming OFDM signals provide an opportunity for substantially eliminating the need for installing equipment at the headend for sampling the OFDM signals, to produce reference signal samples for use in a cross-correlation with leakage signal samples and detection of leakage in the field.

Figure 2:
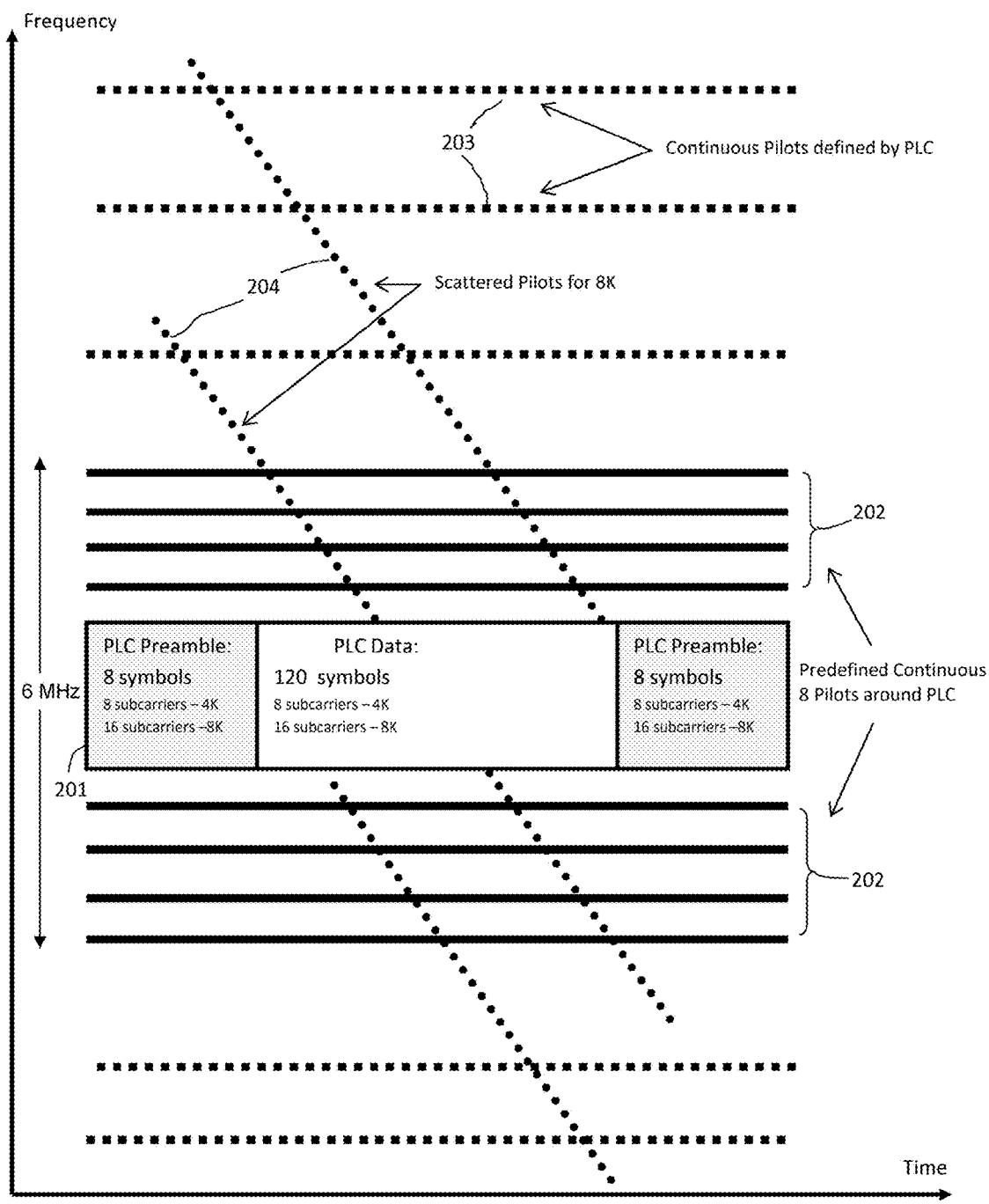
FIG. 2 is a frequency-versus-time diagram, illustrating the placement of PLC subcarriers and pilot subcarriers in a spectrum of an OFDM signal transmitted in a modern HFC network.

Again referring to FIG. 1, leakage detector 102 includes a leakage detector antenna 108, a digital cross-correlation leakage receiver 109, a computer or digital controller (CPU) 110, a display 111, a GPS time-sync module 112, a GPS antenna 113, a wireless modem 114, and a wireless antenna 115. In operation, leakage data server 101 initially retrieves from CMTS's 104, via Simple Network Management Protocol (SNIP), certain parameters of the OFDM signals formed at the different CMTS's 104. Server 101 also stores, in its database, boundaries 106 and/or boundary points 106a-106d of service areas 105, serviced by CMTS's 104. The information about boundaries 106 and/or points 106a-106d are uploaded to server 101 during an initial installation of system 100, and then preferably updated periodically by cable operator IT personal. After receiving the parameters of the OFDM signals from the different CMTS's 104, server 101 constructs so-called OFDM signal signatures for use in cross-correlation detection of OFDM leakage signals. The signatures are based (at least in part) on subcarriers which are part of the structure of an OFDM signal. FIG. 2 shows a typical pattern of different subcarriers used in an OFDM signal. More details about the OFDM signal structure and a method of constructing OFDM signal signatures are discussed below.

After powering up, leakage detector 102 connects to server 101 via an IP wireless network 116 and receives from server 101 ODFM signatures and updated information about boundaries 106 and/or boundary points 106a-106d. Initially, all boundary information is uploaded to CPU 110 of detector 102 during initial preparation of detector 102 for operation, and then only changes in the boundary information are updated in the CPU 110 via wireless network 116. This approach reduces wireless traffic and the handling of redundant information. Electronic files containing the boundary information and OFDM signatures are stored in memory associated with CPU 110.

A service vehicle or truck (not shown) containing leakage detector 102 starts patrolling the coaxial cable plant of HFC network 103. As shown in FIG. 1, the truck moves along a path 117, which extends through service areas 105. Areas 105 are serviced by different CMTS's 104, as shown in FIG. 1. Each second (or more often), CPU 110 of leakage detector 102 receives current GPS coordinates from GPS module 112 and determines the service area 105 in which the truck is currently located. Based on this information, CPU 110 sends to leakage receiver 109 a corresponding OFDM signature. Receiver 109 receives and down converts the over-the-air (or "off-air") OFDM leakage signal to a baseband signal and then cross-correlates it with the current OFDM signature, to detect the OFDM off-air leakage signal. When the truck approaches a boundary of a succeeding service area 105, in which the leak may be present, then CPU 110 sends to receiver 109 signatures of both the current and succeeding service areas 105. Receiver 109 then performs cross-correlation. processing using both (or more) signatures, ensuring that the leakage signal is detected, whether originating from the current or succeeding service area 105. Also, the use of both signatures allows for the simultaneous detection of leakage originating from both adjacent service areas 105, especially when the truck is in a zone near a boundary 106 ("boundary zone"). Generally, the need to employ multiple signatures should not arise often, because service areas 105 are much larger than the smaller boundary zones (+/−30 . . . 100 meters) where measurable leakage may originate from an adjacent service area 105. From this discussion, it is understood that leakage detector 102 is adaptive, in that it selects an OFDM signature based on the service area 105 in which it is operating. Also, continuous wireless communication between detector 102 and server 101 is not necessary and is preferably not conducted. Information about leak level and time delay measurements and geographic coordinates of those measurements along route 117 is buffered in memory associated with CPU 110. CPU 110 will then periodically send short reports to server 101, via wireless modem 114, when the truck travels in an area with good signal strength of wireless network 116.

Figure 3A:
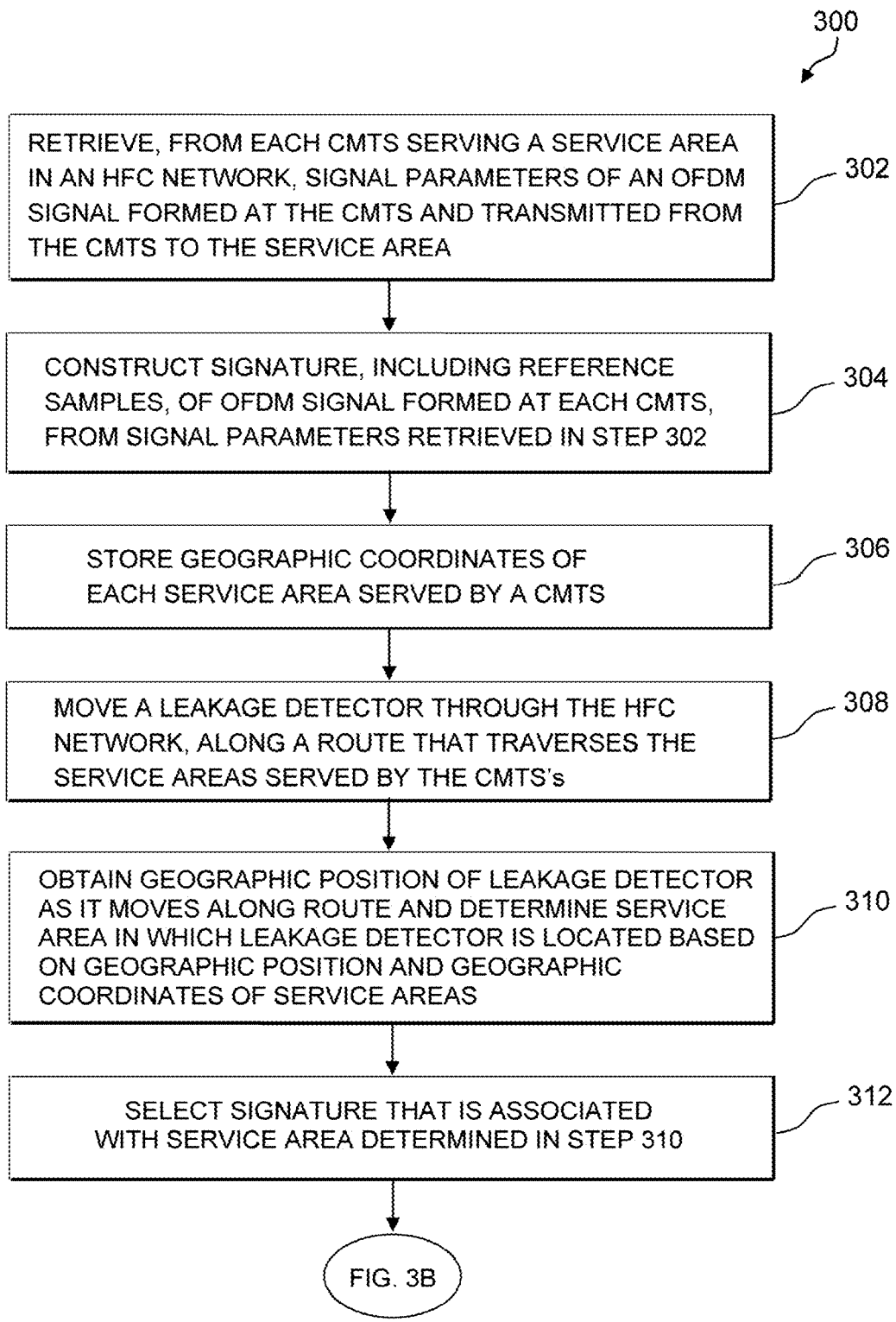
FIGS. 3A and 3B contain a flow diagram outlining a preferred method of detecting and locating an OFDM signal leak from an HFC network.
Figure 3B:
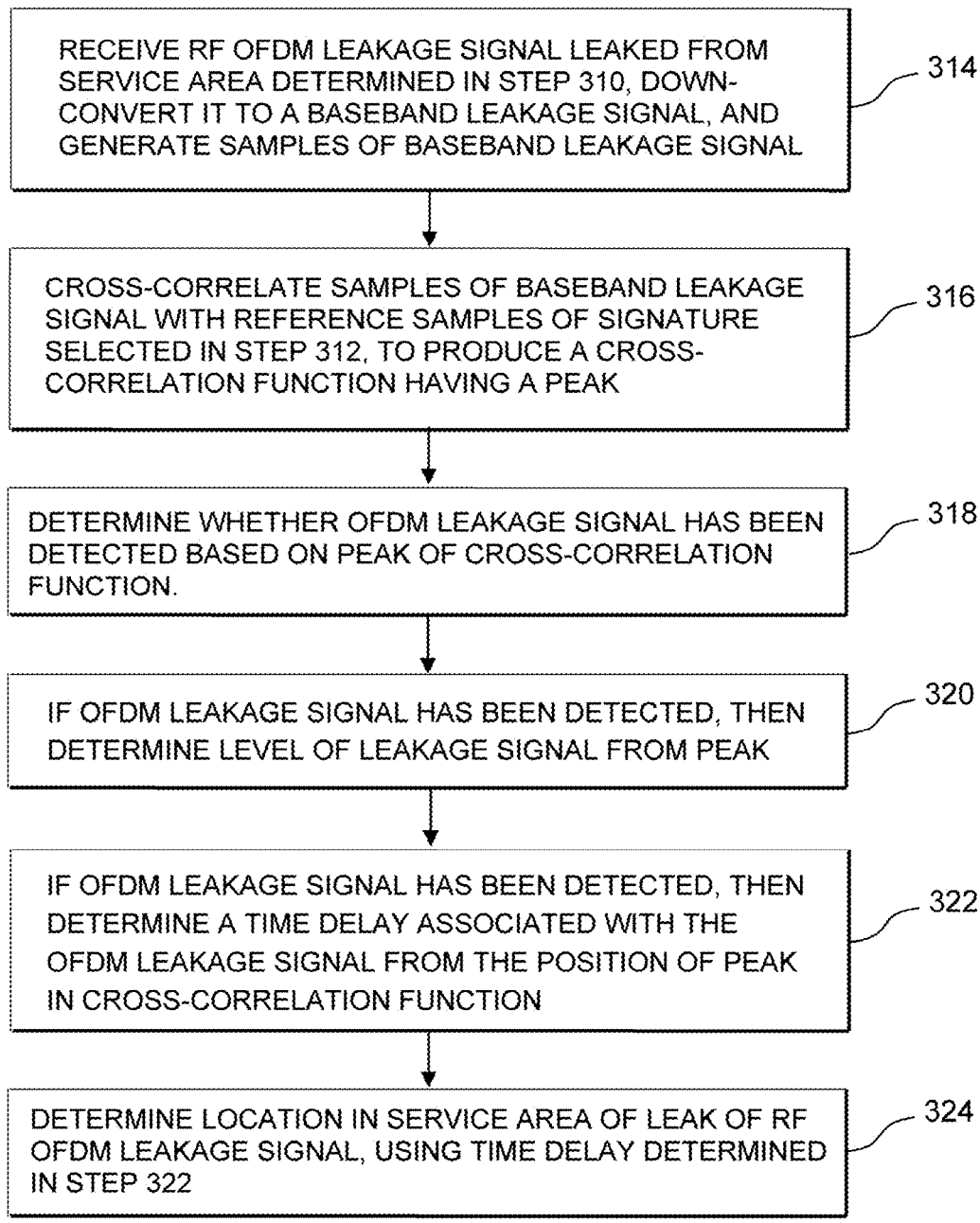
Figure 17:
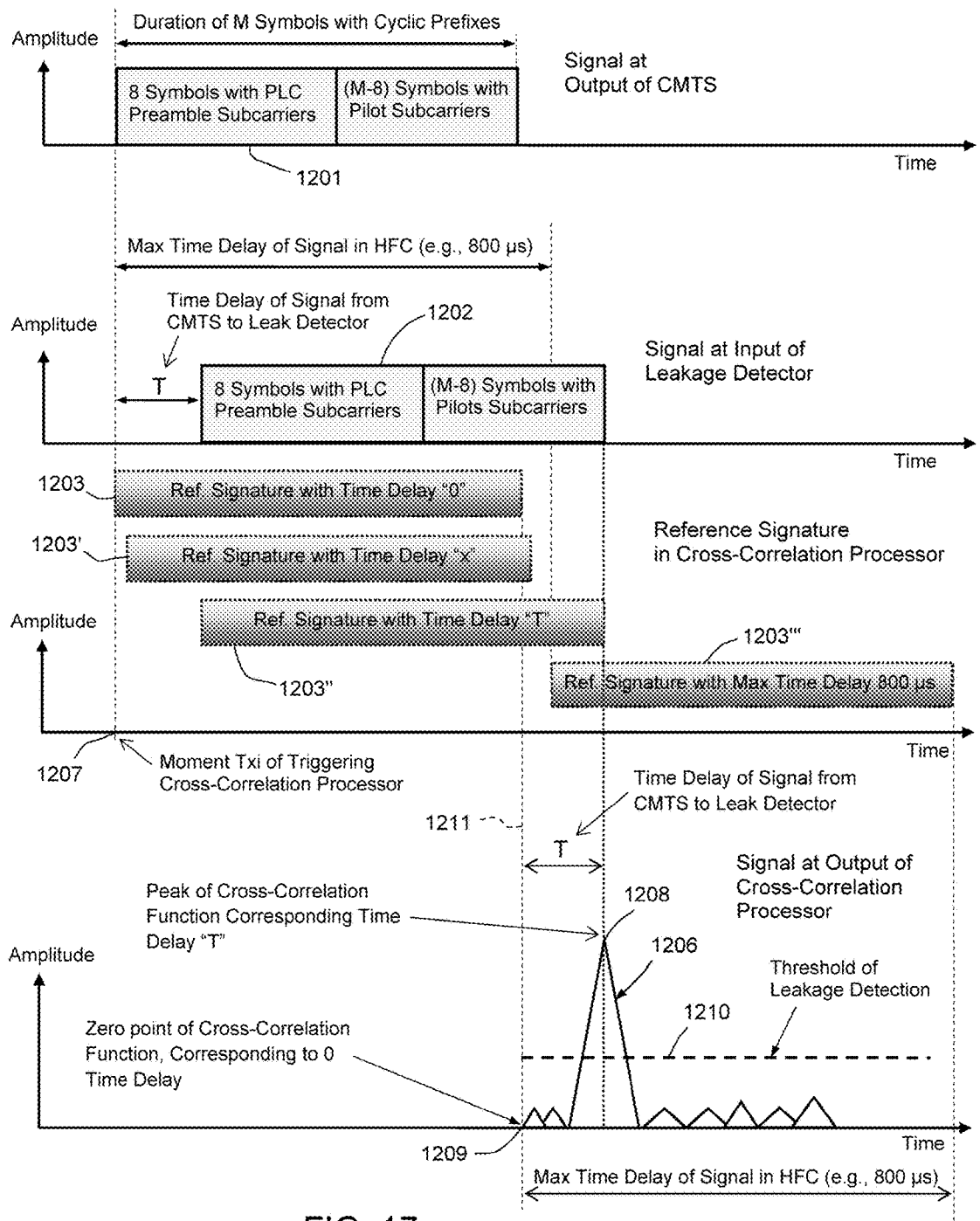
FIG. 17 is a series of amplitude versus time plots (time diagrams), illustrating the timing of: (a) an OFDM signal at the CMTS, (b) the signal (delayed) as received by the leakage detector, (c) an OFDM signature and delayed versions of the signature in a cross-correlation processor of the leakage detector, and (d) a cross-correlation function, at the output of the cross-correlation processor, containing a peak, which indicates a detection and level of the leakage signal and a time delay associated with the leakage signal.

A method of detecting and locating an OFDM signal leak, according to one embodiment of the present invention, will now be described with reference to the flow diagram in FIGS. 3A and 3B. A method 300 (FIG. 3A) comprises a number of steps in detecting and locating OFDM signal leakage. A step 302 involves retrieving, from each CMTS serving a service area in an HFC network, signal parameters of an OFDM signal formed at the CMTS and transmitted from the CMTS to the service area. A step 304 involves constructing a signature, including a set of reference samples, of the OFDM signal formed at each CMTS, from the signal parameters retrieved in step 302. A step 306 involves storing a set of geographic coordinates of each service area served by a CMTS. A step 308 involves moving a leakage detector through the HFC network, along a route that traverses the service areas served by the CMTS's (FIG. 1). A step 310 involves obtaining a geographic position of the leakage detector (GPS coordinates) as it moves along the route, and determining the service area in which the leakage detector is located based on the geographic position of the detector and the geographic coordinates of the service areas. A step 312 involves selecting a signature that is associated with the service area determined in step 310. Referring to FIG. 3B, a step 314 involves receiving an RF OFDM leakage signal leaked from the service area determined in step 310, down-converting it to a baseband leakage signal, and generating samples of the baseband leakage signal. A step 316 involves cross-correlating samples of the baseband leakage signal with reference samples of the signature selected in step 312, to produce a cross-correlation function having a peak (FIG. 17). A step 318 involves determining whether an OFDM leakage signal has been detected based on the peak of the cross-correlation function (e.g., based on whether the peak has exceeded a threshold, see FIG. 17). If a leakage signal has been detected, then, in a step 320, the level of the leakage signal is determined from the peak and, in a step 322, a time delay associated with the leakage signal (e.g., actual propagation time from CMTS to leakage detector) is determined from the position of the peak in the cross-correlation function. Lastly, in a step 324, a location (in the service area) where the RF OFDM leakage signal leaked is determined using the time delay determined in step 322.

One advantage of the present invention is that it will not be necessary to install equipment at the headend of network 103 for sampling the OFDM signal and to continuously transmit the resulting samples to a leakage detector in the field, via a wireless network. This advantage is achievable due, in part, to the common GPS synchronized clock used in forming the OFDM signals at the different CMTS's 104. But, how is it possible to perform cross-correlation detection of an ODFM leakage signal if the signal is like a noise signal? An answer to that question begins by referring to FIG. 2. A feature of an OFDM signal is that it is not as random as, for example, a QAM signal. An OFDM signal includes special predefined subcarriers for synchronization with cable modems (CMs) and for estimation of channel frequency response. These subcarriers have predefined BPSK modulation of OFDM symbol data, and the CMTS's that generate the OFDM signals have information (or parameters) about the modulation and about the frequency location and timing of the subcarriers in the OFDM symbols.

As shown in FIG. 2, an OFDM signal includes the following four groups of subcarriers formed by a CMTS:

1. Physical layer Link Channel (PLC) subcarriers 201, carrying a preamble of 8 symbols and a data payload of 120 symbols, thus having a period of 128 symbols. The number of PLC subcarriers in each symbol depends on the FFT mode, the number being 8 for a 4K FFT mode and 16 for an 8K FFT mode.

2. Eight predefined continuous pilot subcarriers 202 placed symmetrically (in the OFDM signal spectrum) at fixed locations around PLC subcarriers 201.

3. Other continuous pilot subcarriers 203, the placement of which (in the OFDM signal spectrum) is calculated independently at each CMTS and then defined in the PLC data. Thus, the number and location of these subcarriers varies and are unique for each CMTS.

4. Scattered pilot subcarriers 204, time synchronized with the PLC preamble.

Figures 4, 5:
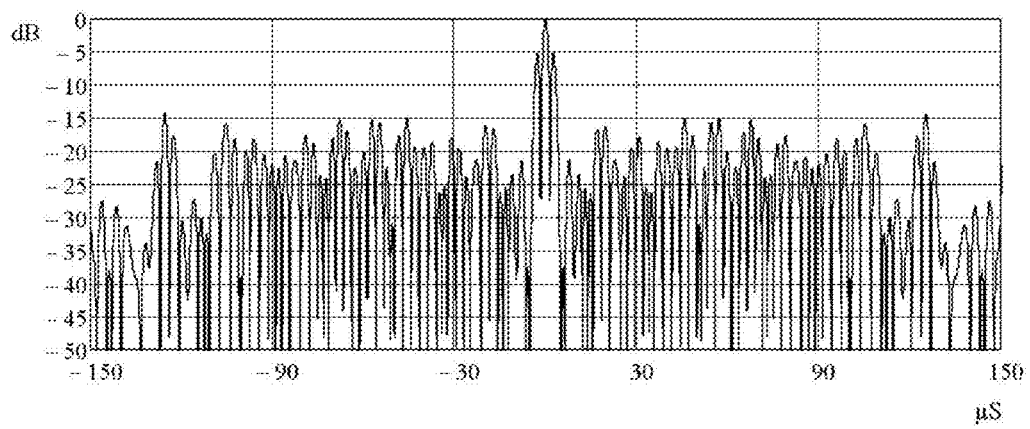
FIG. 4 is a table showing a BPSK constellation matrix for a PLC preamble signal of 8 symbols each containing 8 PLC subcarriers, for the 4K FFT mode, where the binary bits of the constellation matrix are used to BPSK modulate the PLC subcarriers.
FIG. 5 is a plot of an auto-correlation function of the PLC preamble signal of FIG. 4, over a time interval of +/−150 microseconds, which is comparable to a duration of 8 symbols in the 4K mode.
Figures 6, 7:
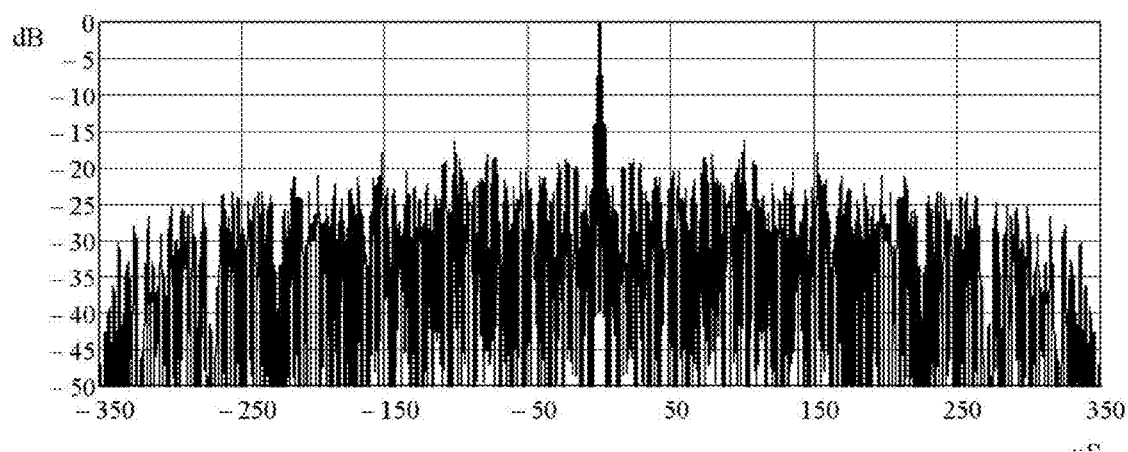
FIG. 6 is a table showing a BPSK constellation matrix for a PLC preamble signal of 8 symbols each containing 16 PLC subcarriers, for the 8K FFT mode, where the binary bits of the constellation matrix are used to BPSK modulate the PLC subcarriers.
FIG. 7 is a plot of an auto-correlation function of the PLC preamble signal of FIG. 6, over a time interval of +/−350 microseconds, which is comparable to a duration of 8 symbols in the 8K mode.

All of the above subcarriers have BPSK modulation within the OFDM symbols. For pilot subcarriers 202, 203 and 204 (groups 2-4), the BPSK modulation depends on the location of the subcarrier in the OFDM symbol and is defined by a pseudo-random sequence described in the DOCSIS 3.1 specifications. The BPSK modulation for the preamble portion of PLC subcarriers 201 is fixed and defined in the DOCSIS 3.1 specifications. FIGS. 4 and 6 show BPSK constellation matrixes for the preamble portion of PLC subcarriers 201, in the 4K and 8K ITT modes respectively. Thus, if the locations (placement) of the subcarriers in the OFDM symbols are known (e.g., initially pulled from CMTS's 104), then for any combination of subcarriers, it is possible to construct reference samples (as part of a signature) representing the original OFDM signal, for optimal cross-correlation detection. A method of constructing such reference samples and a complete OFDM signature will be discussed in more detail below.

Selection of OFDM Subcarriers for Cross-Correlation Detection

Now refer back to FIG. 2 for a discussion on which groups of predefined subcarriers should be used for cross-correlation detection of OFDM signal leakage. As known, the signal-to-noise ratio at the output of a cross-correlation detector (or a matched filter) depends on the energy of the useful signal and the spectral density of the noise (in the case of Gaussian white noise). So, from the point of view of effective detection of low level leakage signals, we wish to select a spectrum band where the energy of the predefined subcarriers is high or maximal. According to the DOCSIS 3.1 specifications, all pilot subcarriers in groups 2-4 (above) are boosted 6 dB relative to the level of other data subcarriers. Therefore, the use of subcarriers in one or more of groups 2-4 should be considered. However, the typical frequency off-set of continuous pilot subcarriers 203 (group 3) may be, e.g., about 4 MHz, according to the DOCSIS 3.1 specifications. Thus, this would require a very wide bandwidth for a leakage detector to receive a number of subcarriers 203. As a result, many strong off-air (over-the-air broadcast) interfering signals within the bandwidth of the detector may be received at the input of a low noise amplifier (LNA) of the detector and impact (overload) the leakage detector. FIG. 2 shows that the densest concentration of subcarriers is around PLC subcarriers 201. According to DOCSIS 3.1 specifications, PLC subcarriers 201 and predefined continuous pilot subcarriers 202 should be placed within a 6 MHz band (in the RF OFDM signal spectrum) "that is less susceptible to noise and interference." This means that off-air interfering signals should be minimal at the selected 6 MHz band. In light of the above considerations, it is preferred that PLC subcarriers 201 and adjacent continuous pilot subcarriers 202 be selected for detection of OFDM leakage.

Another factor in selecting subcarriers for cross-correlation detection is the form of the auto-correlation function of the subcarriers. Ideally, the form should approach the Dirac delta function to provide good resolution in the time domain, for measuring time delay of the signal. Time delay is used to locate the leak under a TDOA method or network database method. It is also desirable to have low side lobes in the auto-correlation function, to minimize false detection and mistakes in measuring time delay. FIGS. 5 and 7 show auto-correlation functions for 4K and 8K FFT modes, respectively, of the PLC preamble signal. The preamble signal comprises 8 symbols each containing the PLC subcarriers 201. In the 4K FFT mode of FIG. 5, there are 8 PLC subcarriers 201 (see FIG. 4), and in the 8K FFT mode of FIG. 7, there are 16 PLC subcarriers 201 (see FIG. 6). These functions are plotted over a time interval comparable to the duration of 8 symbols: +/−150 microseconds for the 4K FFT mode (each symbol containing 8 subcarriers) and +/−350 microseconds for the 8K FFT mode (each symbol containing 16 subcarriers). As shown in FIGS. 5 and 7, the auto-correlation functions of the PLC preamble signals have a dominant peak and multiple side lobes down from the peak by approximately 20 dB for the 8K FFT mode and a few dB higher for the 4K FFT mode. Thus, the PLC preamble signal is suitable for cross-correlation detection of OFDM leakage. The total energy of the preamble signal is not relatively high because it is made up of only 8 symbols. However, the extra energy of pilot subcarriers 202 are used to increase the total energy and achieve a more optimum cross-correlation detection result.

Figure 8:
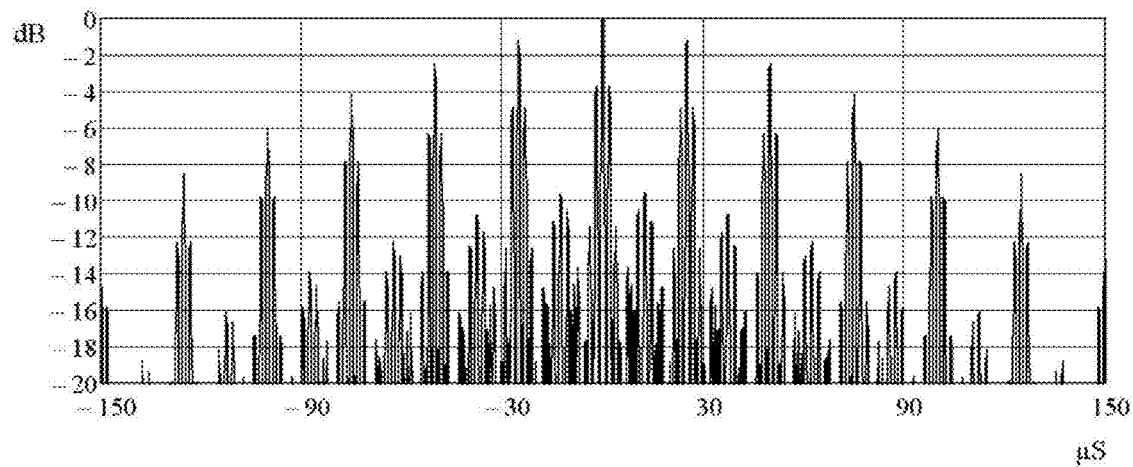
FIG. 8 is a plot of an auto-correlation function of a "pilot" signal of 8 symbols each containing the 8 predefined continuous pilot subcarriers (adjacent to the PLC subcarriers), the function being plotted over a time interval of +/−150 microseconds.
Figure 9:
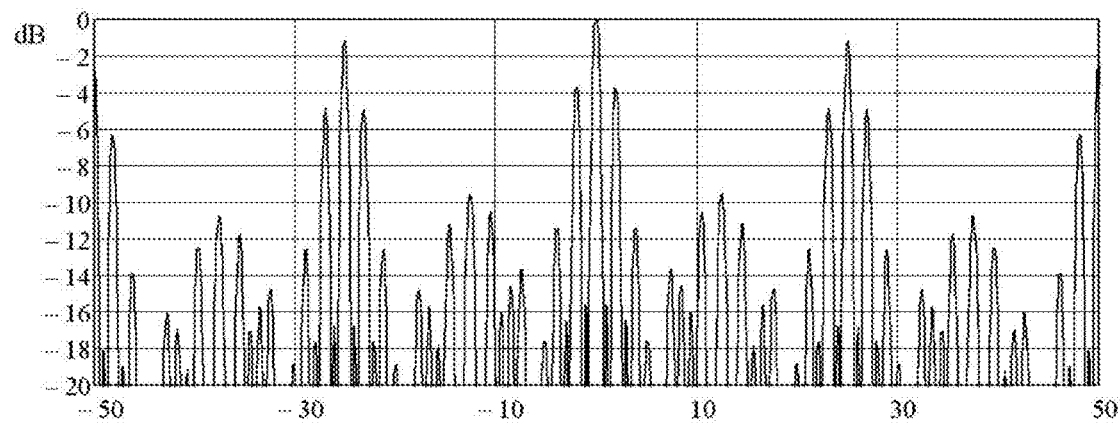
FIG. 9 is a plot of the auto-correlation function of FIG. 8, except over a time interval of +/−50 microseconds.
Figure 10:
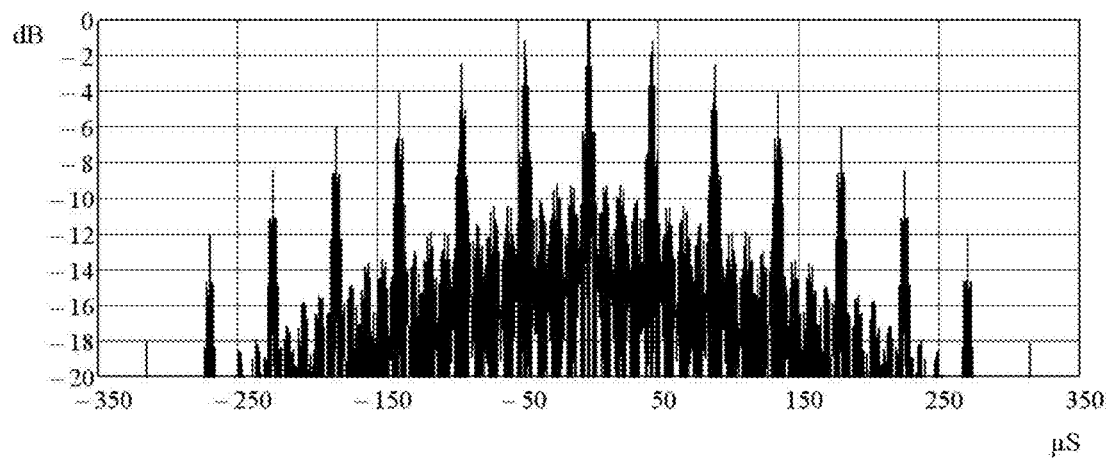
FIG. 10 is a plot of an auto-correlation function of a pilot signal of 8 symbols each containing the 8 predefined continuous pilot subcarriers, the function being plotted over a time interval of +/−350 microseconds.
Figure 11:
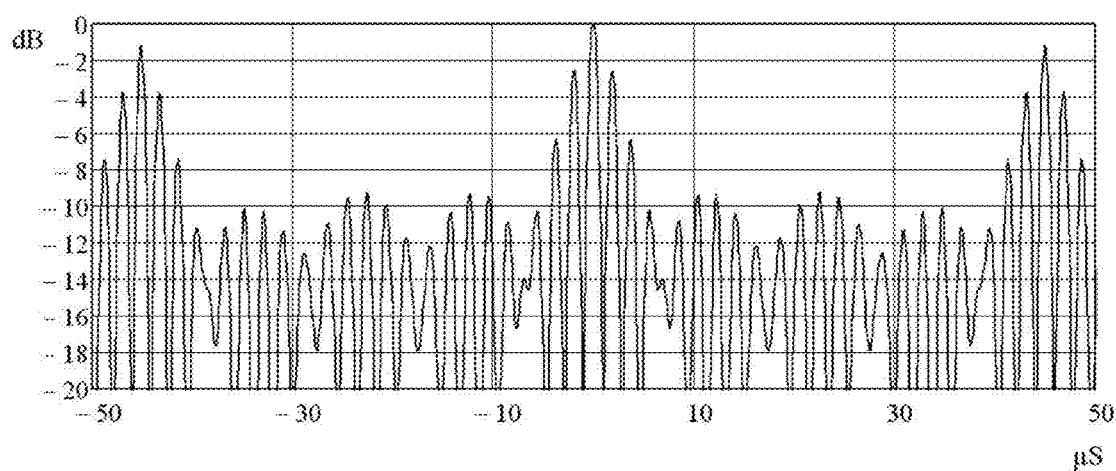
FIG. 11 is a plot of the auto-correlation function of FIG. 10, except over a time interval of +/−50 microseconds.

FIGS. 8 and 10 each show an auto-correlation function of a "pilot signal" that comprises 8 symbols, each containing the 8 predefined continuous pilot subcarriers 202. The auto-correlation functions in FIGS. 8 and 10 are plotted over time intervals +/−150 microseconds and +/−350 microseconds, respectively. These time intervals are the same as for the PLC preamble signals of FIGS. 5 and 7. FIGS. 9 and 11 are zoomed-in versions of FIGS. 8 and 10, respectively, showing the auto-correlation functions over a time interval of +/−50 microseconds. The auto-correlation functions in FIGS. 8 and 10 contain multiple peaks, which, under certain circumstances, could create ambiguities in measuring time delay. However, the absolute level of the highest peak of the auto-correlation function in FIG. 8 (4K mode) is about 6 dB higher than the peak in the PLC preamble auto-correlation function in. FIG. 5 (4K mode). This is due to the CMTS's 104 boosting the level of the pilot subcarriers by 6 dB. For the 8K mode, the absolute levels of the auto-correlation functions in FIGS. 7 and 10 are the same, because the number of PLC subcarriers at the 8K mode is 16, or two times more than at the 4K mode. Thus, despite the multiple peaks in the auto-correlations of pilot subcarriers 202, if both groups of subcarriers (PLC and predefined pilot subcarriers) are used, this should produce an increase in energy of the signals for cross-correlation and a resulting increase in sensitivity of cross-correlation detection of OFDM leakage signals. Also, the energy of predefined pilot subcarriers 202 (actually of the pilot signal) may be increased by increasing the number of symbols (in the time domain) included in the pilot signal. As shown in FIG. 2, the PLC preamble signal exists over only 8 symbols, but the pilot subcarriers exist over a continuous sequence of symbols. So, by increasing the number of symbols included in the pilot signal, e.g., from 8 to 16 or from 8 to 32, the sensitivity of cross-correlation detection may be increased by approximately 2-3 dB or 4-6 dB, respectively. Of course, there is a limitation on an increase in symbols, which is based on the period of the signal chosen for cross-correlation detection. For example, if the PLC signal is chosen, the number of symbols included in the pilot signal may be limited to 128 (see discussion of the PLC signal period Tplc below).

A further factor in choosing a subcarrier group for optimal OFDM leakage detection is whether there is a timestamp associated with the subcarrier group. A timestamp can be used for measuring a time delay of a subcarrier between a CMTS 104 and leakage detector 102. The time delay is used to locate the source of the leak under a TDOA algorithm or the network database method. Also, the timestamp can be used to trigger the cross-correlation process in leakage receiver 109. The use of timestamps is well-known in cross-correlation detection. There are two possible scenarios when considering timestamps: (1) the absolute (global GPS) time when formation of the signal at CMTS 104 begins is known; and (2) only the period of the signal formed at CMTS 104 is known. The first scenario exists in the leakage detection method described in U.S. Pat. No. 8,456,530, where signal sampling equipment (with a GPS receiver) is installed at the headed. Under this scenario, it is relatively straight forward to measure the absolute time delay of the leakage signal by cross-correlation detection. In the second scenario, absolute time delay is not measured, but, because the period of the signal formed at CMTS 104 is known and synchronized by a very stable GPS time sync, the cross-correlation receiver may be triggered with. the period. Also, the cross-correlation peak (indicating detection of the leakage signal) will appear at a particular point on the time scale (time delay value) for a particular position of the leakage detector. As the leakage detector moves to a new position and detects the leakage signal at the new position, the point on the time scale is likely to move, representing a relative change in the time delay of the signal. This relative change makes it possible to measure time difference of arrival of the leakage signal based on different detector positions along the drive-out route. Thus, a TDOA algorithm is suited for the measurements obtained in the second scenario and can use them to calculate the location of the leakage source.

Figure 12:
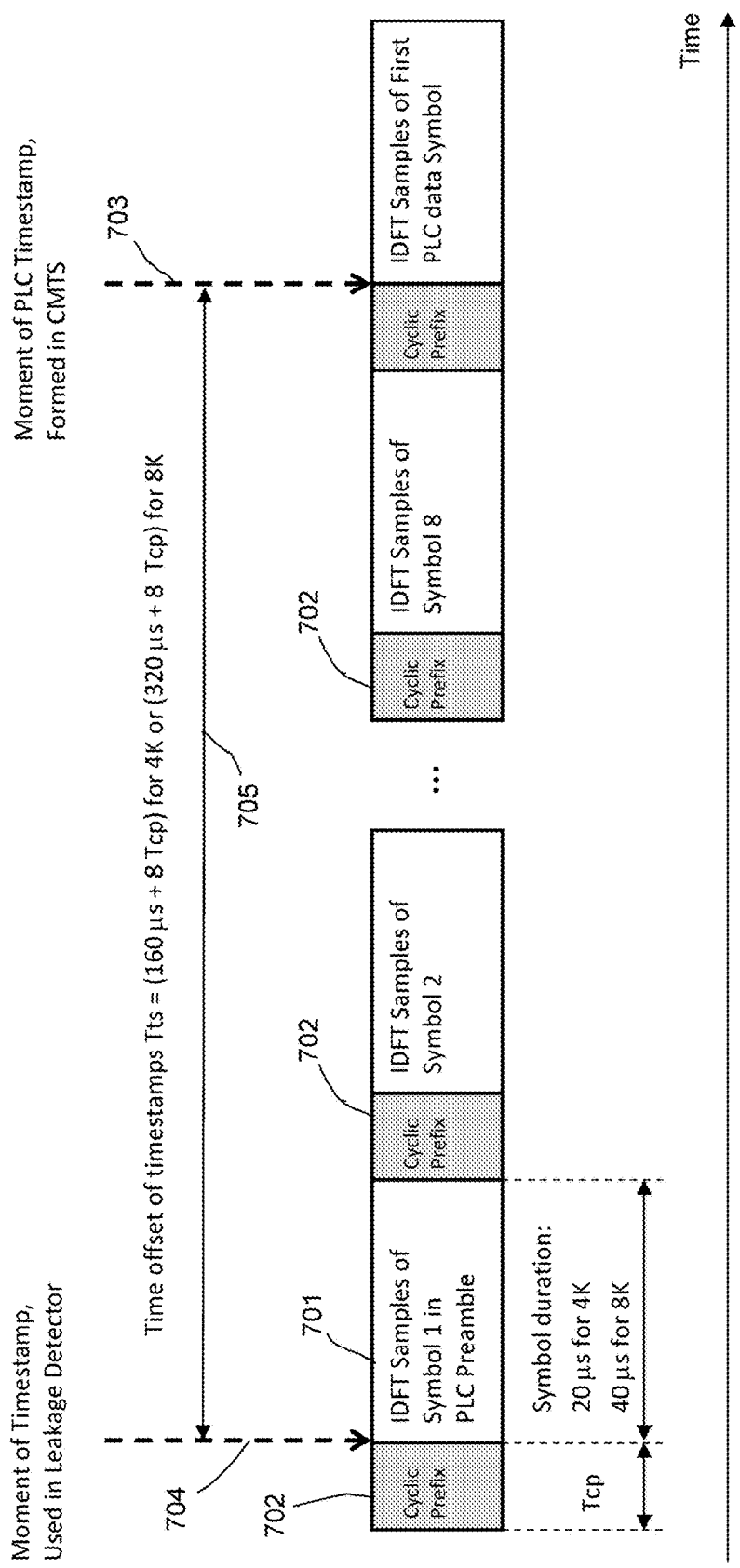
FIG. 12 is a time-frequency plane representation of PLC preamble symbols separated by cyclic prefixes, and indicating the moment of a PLC timestamp at the CMTS and the moment of a created timestamp used at the cross-correlation receiver.

Referring now to FIG. 12, there is shown a structure of the PLC preamble portion of an OFDM signal in the time domain. The PLC preamble includes eight symbols 701, each comprising pulses or inverse discrete Fourier transform (IDFT) samples. Symbols 701 each have a duration of 20 microseconds or 40 microseconds for 4K and 8K FFT modes, respectively. Symbols 701 are assembled together by the CMTS with cyclic prefixes or cyclic prefix (CP) pulses 702. The duration of cyclic prefixes 702 is defined in the DOSCIS 3.1 specification and may be different at different CMTS's 104 (FIG. 1). FIG. 12 shows (by a dotted-line arrow) a moment 703 of a timestamp formed by a CMTS. According to the DOCSIS 3.1 specification, "CMTS MUST define this timestamp with reference to the first OFDM symbol following the preamble." FIG. 12 also shows a moment 704 of the first sample after the IDFT of the first PLC preamble symbol in the frequency domain. Moment 704 is the moment when the PLC preamble of the OFDM signal (used for cross-correlation detection) starts to be formed with PLC subcarriers. Moment 704 is used for triggering the cross-correlation process in leakage detector 102. Moment 704 is strongly synchronized with the CMTS timestamp at moment 703 and is offset from it by Tts=(160 microseconds+8 Tcp) for the 4K FFT mode and Tts=(320 microseconds+8 Tcp) for the 8K FFT mode. So, if the CMTS timestamp (at moment 703) is known (e.g., initially retrieved from CMTS 104 by server 101), then moment 704 can be calculated at server 101.

If, for some reason, CMTS's 104 do not employ a timestamp (the DOSCIS 3.1 specification indicates that a timestamp is an optional requirement), then the period of the PLC signal, which is synchronized to a very stable GPS time sync, may be used for triggering the cross-correlation detector and measuring relative time delay (as indicated above). The period of the PLC signal equals 128 symbols (see FIG. 2) and its time duration is calculated as follows: Tplc=(2560 microseconds+128 Tcp) for the 4K HT mode and Tplc= (5120 microseconds+128 Tcp) for the 8K FFT mode.

In view of the factors discussed above, both the PLC preamble and pilot signals (FIG. 2) are selected for cross-correlation detection of OFDM leakage signals. The minimum number of symbols should be at least 8 (number of symbols of preamble), but the number of symbols in the pilot signal may be increased to improve the sensitivity of the cross-correlation detection. It should be noted that the PLC preamble and pilot signals are placed within a 6 MHz bandwidth (FIG. 2), which is equal to the current U.S. QAM channel bandwidth and used in the current QAM Snare® cross-correlation leakage detectors (www.arcom-digital.com). Thus, to reconfigure the QAM Snare® system for detection of OFDM leakage, the QAM Snare® detector hardware will not have to be changed. The reconfiguration can be accomplished by updating the software in the leakage data server and the firmware in the detector. Reconfiguration is straight forward due to flexible re-programmable FPGA's and DSP's. Thus, the preferred embodiment of the present invention can be implemented in a cost-effective manner.

Construction of OFDM Signature

Figure 13A:
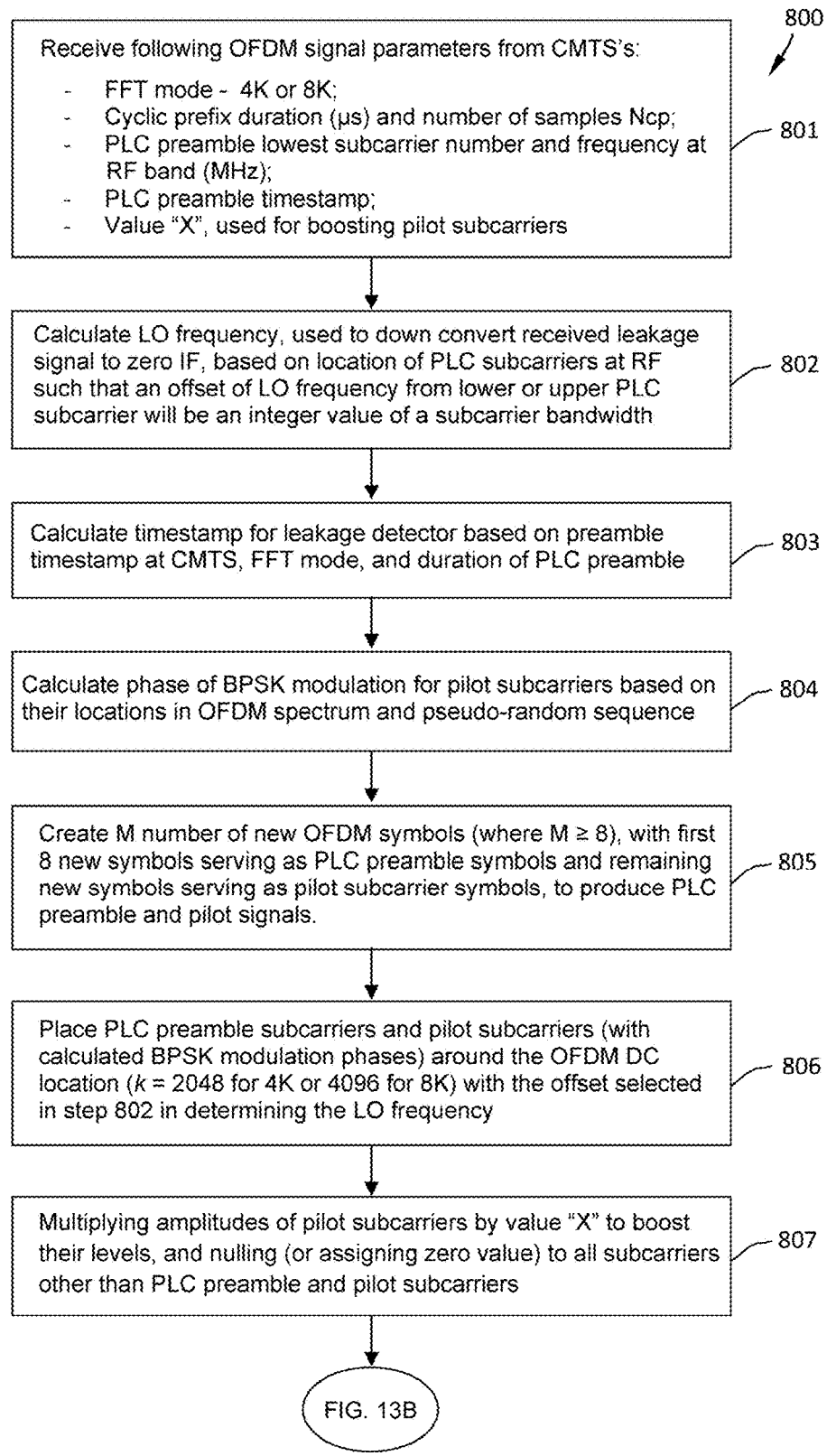
FIGS. 13A and 13B show a flow diagram illustrating a method of the present invention of creating an OFDM signature for use in detecting leakage of an OFDM signal.

In order to achieve the objective of cross-correlation detection without the use of signal sampling equipment at the headend or at each CMTS, an OFDM signature is constructed or calculated in leakage data server 101 (FIG. 1). An exemplary method 800 of constructing such a signature is presented in the flow diagram of FIGS. 13A and 13B. In a first step 801, data server 101 retrieves from all CMTS's 104 (via SNMP) the following OFDM signal parameters: (1) the FFT mode, 4K or 8K; (2) cyclic prefix duration (in microseconds) and number of cyclic prefix samples Ncp; (3) lowest subcarrier number in PLC preamble and its frequency in the RF band (MHz); (4) PLC (or CMTS) timestamp; and (5) value "X," used for boosting pilot subcarriers.

In a second step 802, data server 101 calculates a local oscillator (LO) frequency, which is used to down convert the received leakage signal to zero IF (baseband) in leakage receiver 109. For this calculation, information is used about the location of the PLC subcarriers at RF (e.g., the lowest RF (MHz) subcarrier frequency in the PLC preamble). In the preferred embodiment, the following rules are used for calculation of the LO frequency:

1. The LO frequency must equal an RF frequency of a subcarrier. This requirement provides (as will be shown) for a correct or orderly formation of reference samples during an IDFT operation of the OFDM symbols (see FIGS. 14A, 14B & 15).

2. The LO frequency should be selected to be within the bandwidth (e.g., 400 kHz) of the PLC preamble subcarriers, plus or minus some frequency offset (in KHz). The offset is defined based on the maximum frequency of the baseband leakage signal at leakage receiver 109. For example, if the maximum baseband frequency is 3000 kHz, then the offset is determined by the formula:

$$\text{Offset (kHz)}=3000\ \text{kHz}-400\ \text{kHz}-2350\ \text{kHz}=250\ \text{kHz},$$

where 400 kHz is the bandwidth of the PLC subcarriers and 2350 kHz is the maximum fixed offset of predefined continuous pilot subcarriers 202 from the edge of the PLC subcarriers band (DOCSIS 3.1 Specification). Thus, for an offset of +/−250 kHz, the LO frequency may be placed anywhere within a band from RF min=(lower PLC subcarrier RF frequency−250 kHz) to RF max=(upper PLC subcarrier RF frequency+250 kHz). Under these conditions, all PLC subcarriers 201 and predefined pilot subcarriers 202 will be down-converted into a working baseband of 3 MHz (FIG. 14B).

3. The LO frequency should also be selected to minimize interference with internal harmonics that may be generated in leakage detector 102, e.g., by a master clock. For example, if leakage detector 102 is clocked at 10 MHz by a master clock, then high order harmonics with 10 MHz steps may overlap with the (RF max−RF min) band selected under Rule 2 above. In this case, to prevent such interference at baseband, an LO frequency is selected to be equal to an interfering harmonic. Due to the fact that the LO frequency would also be synchronized by the 10 MHz master clock, this would result in the suppression of the harmonic at baseband, because the LO frequency is converted to zero (DC) frequency.

FIGS. 14A and 14B illustrate an example of selecting an LO frequency for the 4K FFT mode and a 3 MHz baseband in leakage receiver 109. As shown in FIG. 14A, LO frequency 901 is selected to be 100 kHz higher than the upper edge of the PLC subcarrier band and equal to the second data subcarrier slot above the PLC subcarrier band edge. At this LO frequency, all PLC subcarriers 201 and the predefined pilot subcarriers 202 from both sides of the PLC subcarrier band (−4, −3, −2, −1, +1, +2, +3, +4 in FIG. 14A) will be down-converted to a 3 MHz baseband, as shown in FIG. 14B.

Now referring back to FIG. 13A, in a step 803, a timestamp Tx (704 in FIG. 12) is calculated for use in leakage receiver 109 and the period of the PLC signal is calculated. Timestamp Tx is calculated by subtracting offset Tts (FIG. 12) from the CMTS timestamp (703 in FIG. 12) retrieved from CMTS 104:

$$Tx=\text{Tcmts}-\text{Tts},$$

where Tts=(160 microsec.+8 Tcp) for 4K FFT mode and Tts=(320 microsec.+8 Tcp) for 8K FFT mode. The PLC signal period is calculated by the early discussed formulas:

$$\text{Tplc}=(2560\ \text{microsec.}+128\ \text{Tcp})\ \text{for 4K FFT mode},$$

and $$\text{Tplc}=(5120\ \text{microsec}+128\ \text{Tcp})\ \text{for 8K FFT mode}.$$

Figure 16:
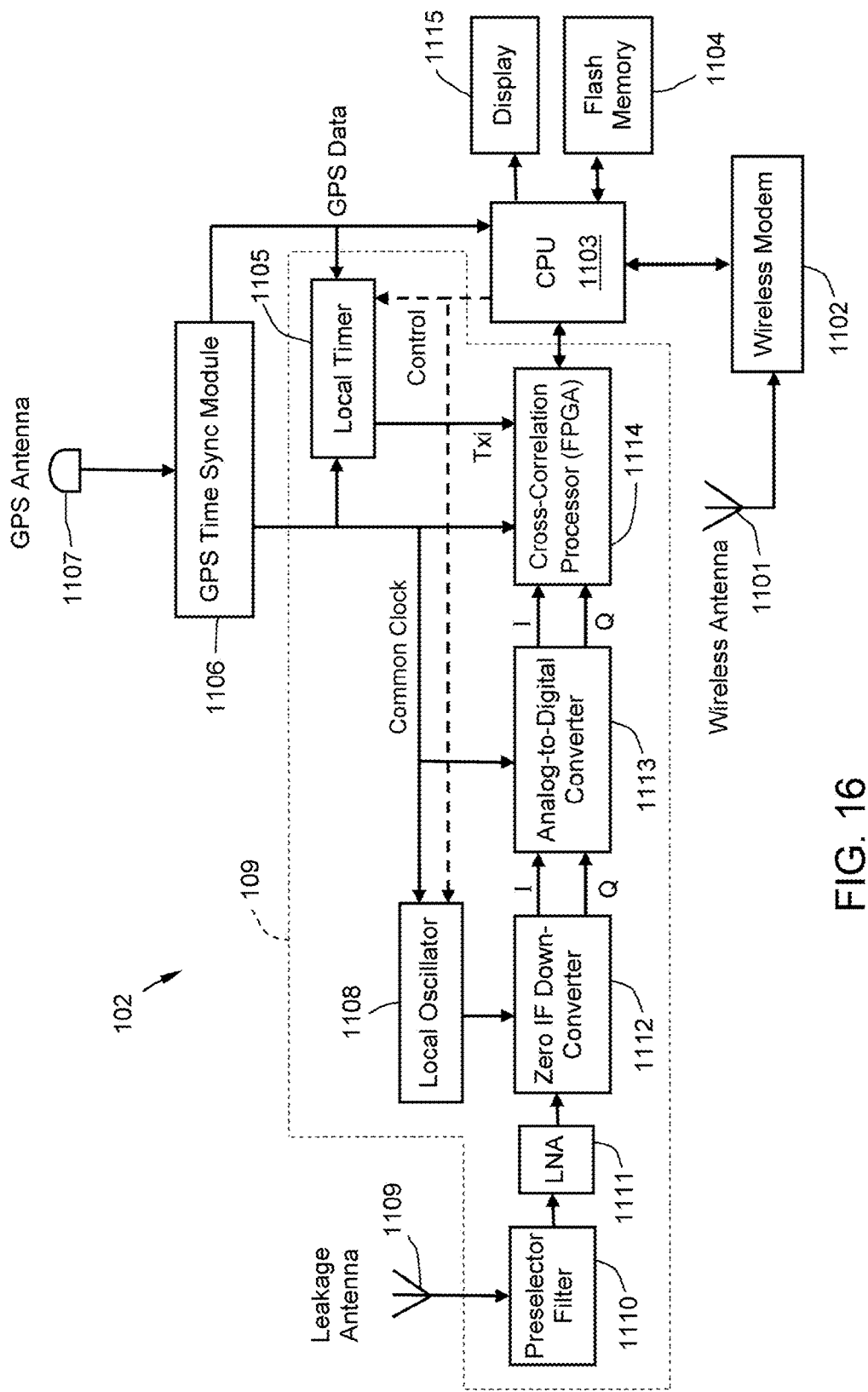
FIG. 16 is a block diagram of one embodiment of a leakage detector of the present invention.

The calculated timestamp Tx is then re-generated in detector 102 to create succeeding local timestamps or triggering pulses Txi. These local timestamps/triggering pulses are created by using the period Tplc and a local GPS clock as a reference clock. In other words, Tx is used to setup the initial phase of the local timer in leakage detector 102 and Tplc is used to setup the period of pulses Txi from the local timer (FIG. 16, 1105). The accuracy of the local GPS clock maintains synchronism of the locally generated timestamps with the CMTS timestamp to within a few microseconds during a day (24 hours). So, in general, it is enough to receive the CMTS timestamp once a day, e.g., upon initial connection to server 101. However, CMTS timestamps may be retrieved from CMTS 104 more frequently than once a day to calculate and update local timestamps Tx more frequently.

In a next step 804 (FIG. 13A), a calculation of BPSK modulation is performed for pilot subcarriers 202. According to the DOCSIS 3.1 specifications, the pilot subcarriers are BPSK modulated using a pseudo-random sequence, which is generated using a 13-bit linear feedback shift register with polynomial $(x^{13}+x^{12}+x^{11}+x^{8}+1)$. The shift register is clocked after every subcarrier (pilot, data, etc.) of the discrete Fourier transform (DFT) defining the OFDM signal. Each subcarrier is designated by an index number, k, which also indicates the actual location of the subcarrier in the RF band of the OFDM signal. The index numbers are: k=0 to 4095 for a 4K FFT signal; and k=0 to 8191 for an 8K FFT signal. If a subcarrier is identified (e.g., by its location or index number k) as a pilot, the output of the shift register is used to define the BPSK modulation for that pilot subcarrier. Further details of the BPSK modulation are found in the DOCSIS 3.1 Physical Layer Specification at section 7.5.15.3 (Jun. 6, 2014).

In addition to actual subcarrier locations indicated by index numbers k, the locations of pilot subcarriers 202 (e.g., designated −4, −3, −2, −1, +1, +2, +3, +4 in FIG. 14A) are also defined relative to the edges (lower and upper) of the PLC subcarrier band by the following table, where "n" is the number of subcarriers from the lower or upper edge:

| FFT Mode | Pilots +/−1 | Pilots +/−2 | Pilots +/−3 | Pilots +/−4 |
| --- | --- | --- | --- | --- |
| 4K (PLC 8 subcarriers) | n = 15 | n = 24 | n = 35 | n = 47 |

-continued

| FFT Mode | Pilots +/−1 | Pilots +/−2 | Pilots +/−3 | Pilots +/−4 |
|---|---|---|---|---|
| 8K (PLC 16 subcarriers) | n = 30 | n = 48 | n = 70 | n = 94 |

The subcarrier frequency spacing is 50 kHz for a 4K FFT signal and 25 kHz for an 8K FFT Thus, the nominal frequency off-sets of pilot subcarriers 202 are the same for 4K and 8K FFT modes and can be easily calculated. They are: 750 kHz for pilots +/−1; 1200 kHz for pilots +/−2; 1750 kHz for pilots +/−3, and 2350 kHz for pilots +/−4. Because data server 101 (FIG. 1) has retrieved the locations of PLC subcarriers 201 (e.g., indicated by index numbers, k), the locations (e.g., indicated by index numbers, k) of pilot subcarriers 202 can be calculated using the above table, and for those locations, server 101 can calculate or determine the BPSK modulation for each pilot 202 (e.g., determine the BPSK modulation phase: 0 or 1 and BPSK constellation point equal to 1+j0 or −1+j0, respectively).

Figure 15:
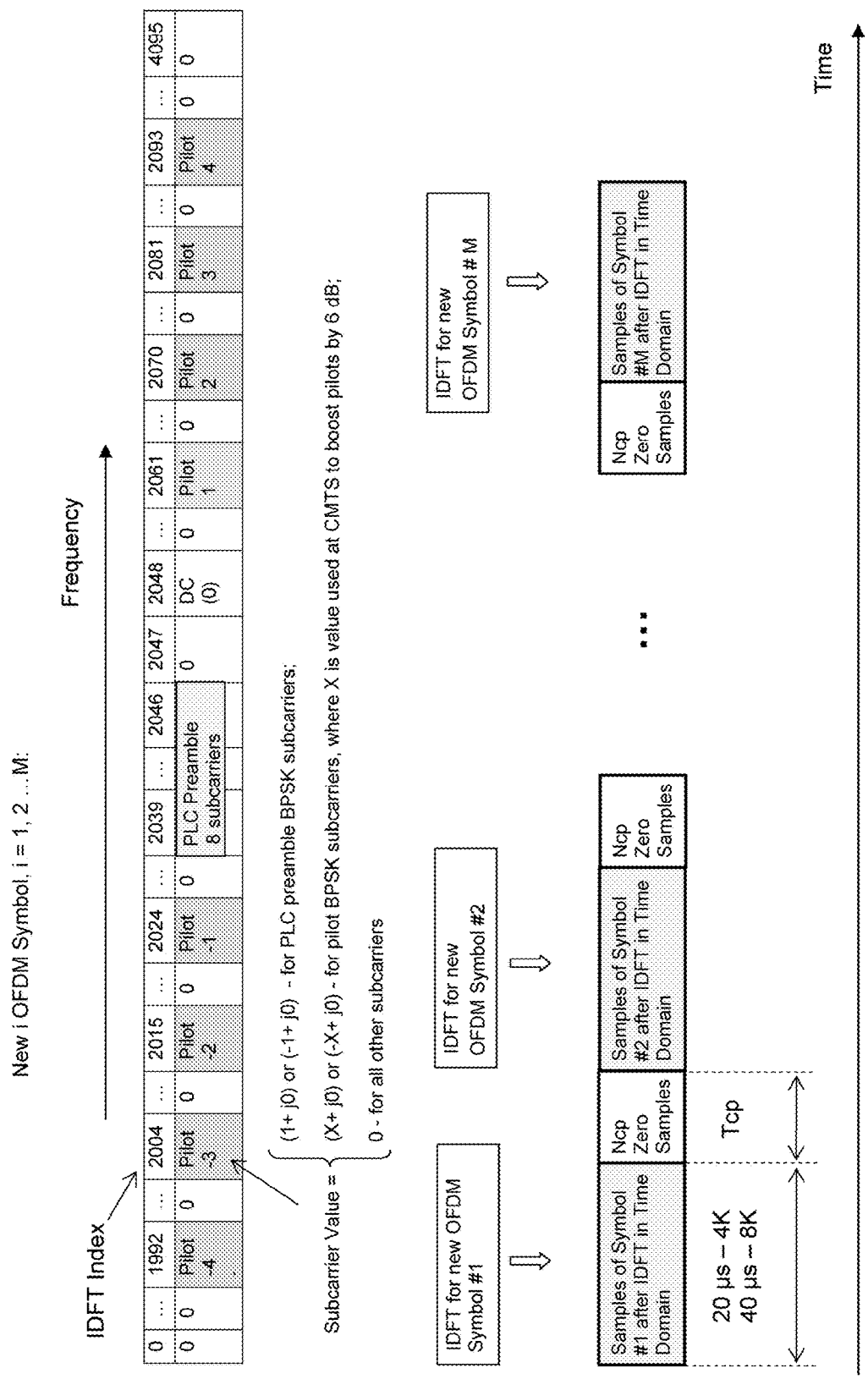
FIG. 15 illustrates some of the steps in forming the OFDM signature, where the steps are: (a) forming M number of new OFDM symbols, (b) assigning values to the different subcarriers of the OFDM spectrum, (c) performing a 4K IDFT of the new symbols to produce reference samples of the resulting time domain signal, and (d) producing zero stuffing samples in place of cyclic prefixes.

In a next step 805 (FIG. 13A), M number of new OFDM symbols are created, where the first eight new symbols are placed at the PLC subcarrier locations, to produce a PLC preamble signal, and the remaining new symbols are place at the predefined continuous pilot subcarrier locations to produce a pilot signal with BPSK modulation phases determined in step 804. FIG. 15 shows an example of creating M number of new symbols for the 4K FFT mode. The new symbols and constructed preamble and pilot signals are used to create baseband OFDM reference signal samples for cross-correlation (in receiver 109) with. actual samples of the detected OFDM leakage signal. This is why the subcarriers selected for detection of OFDM signal leakage (i.e., PLC subcarriers and adjacent continuous pilot subcarriers) are, in a step 806, placed (shifted) into the baseband (area of DC OFDM sample) at the same locations as the corresponding PLC and pilot subcarriers of the actual baseband leakage signal (FIG. 14B). The BPSK modulations of the pilot subcarriers, as determined in step 804, are saved. FIG. 14B illustrates what the baseband signal constructed with the M number of new symbols might look like. The PLC subcarriers (carrying the new symbols) are placed at locations k=2039 to 2046 and are thus off-set by two subcarriers (e.g., 50 kHz×2=100 kHz) from the DC subcarrier slot of k=2048 (FIG. 15). The relative locations of pilot subcarriers (−4, −3, . . . 3, 4) are saved and are the same as with the actual pilot subcarriers.

In a step 807, the amplitude of the pilot subcarriers is increased (relative to the amplitude of the PLC subcarriers) by a value "X" (e.g., 2), which is a value used at the CMTS for boosting the amplitude of the pilots. In step 801, this value "X" was retrieved from CMTS's 104 by data server 101. In the constructed OFDM signature, the other subcarriers (i.e., other than PLC subcarriers and predefined continuous pilot subcarriers) are not used in the detection of the OFDM leakage signal. Thus, in step 807, these other subcarriers are excluded from the M number of new symbols (and from the OFMD signature spectrum) by nulling or zero-valuing these subcarriers prior to the IDFT calculation.

Figure 13B:
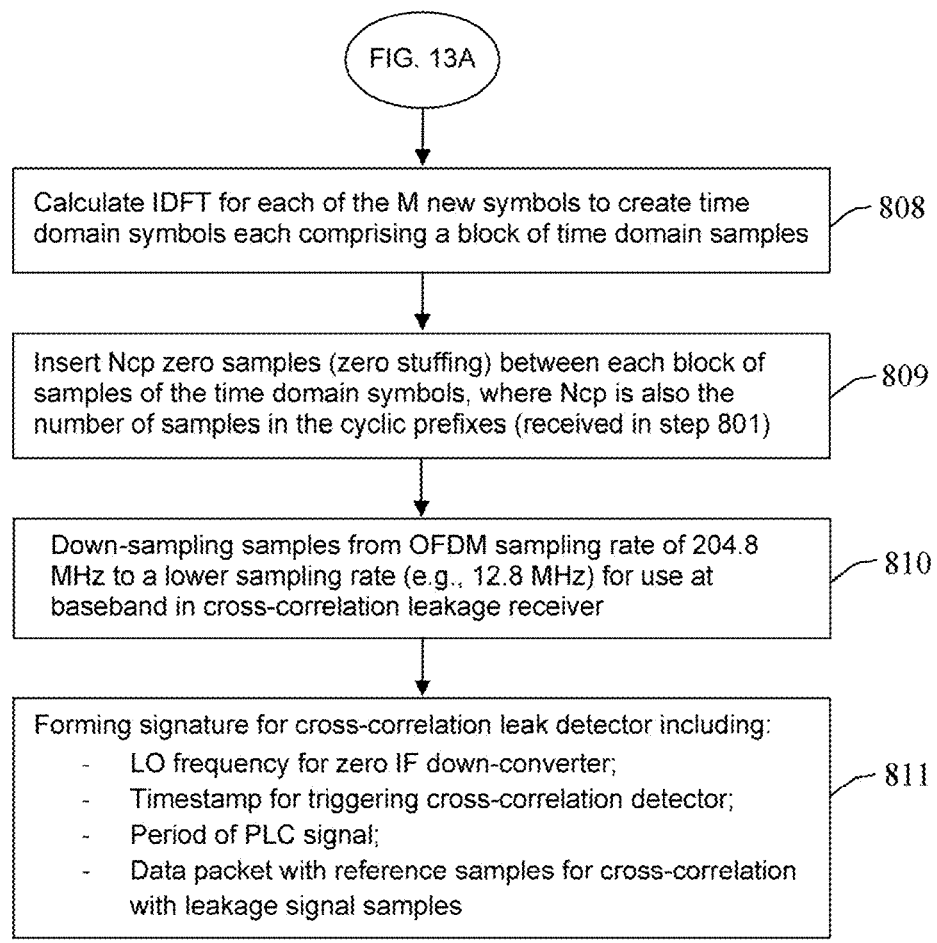

Referring now to FIG. 13B, method 800 of constructing an OFDM signature continues. In a step 808, an IDFT is calculated for each of the M number of new symbols. The results of these calculations are 4K or 8K complex samples for each OFDM symbol in the time domain. The duration of each time domain symbol is 20 microseconds for 4K IDFT (i.e., 4096 samples×1/204.8 MHz) and 40 microseconds for 8K IDFT (8192 samples×1/204.8 MHz), because the IDFT is calculated at a clock rate of 204.8 MHz, according to DOCSIS 3.1 Physical Layer Specification, Section 7.5.7.1 (06/10/14).

In a step 809 (FIG. 13B), Ncp number of zero samples are inserted between the blocks of samples of the M number of time domain symbols ("zero stuffing"), instead of using cyclic prefix samples. The number of zero samples is equal to the number of cyclic prefix samples, Ncp, which number was retrieved from CMTS's 104 in step 801. The sequence of the assembled samples after the IDFT and zero stuffing steps is shown in FIG. 15. It should be noted that the use of zero stuffing instead of cyclic prefixes is done to make the calculation simpler. The energy of the signal at the cyclic prefixes is not essential for leakage detection compared with the energy of the PLC and pilot subcarrier signals.

In a next step 810 (FIG. 13B), the complex samples calculated in step 808 and 809 are transformed into real parts and down-sampled from the 204.8 MHz clock rate (used at IDFT in step 808) to a lower clock rate for cross-correlation in leakage detector 102. The simplest way to down-sample is to divide the 204.8 MHz clock rate by $2^Y$, where Y is an integer. For example, in the case illustrated in FIG. 14B, where the baseband is 3 MHz, it makes sense to select the clock rate for cross-correlation to be 204.8 MHz/$2^4$=204.8/16=12.8 MHz. This makes sense because down-sampling is a simple decimation by 16. If for example, 10 MHz clock is used in the cross-correlation detector, then the procedure of down-sampling will require more calculations (which is not a problem for a powerful CPU used at the server). For example, down-sampling from 204.8 MHz to 10 MHz (for a 3 MHz baseband) can be done by a decimation by 36 to a clock rate of 6.4 MHz, then up-sampling to 160 MHz (6.4×25=160 MHz), and finally a decimation by 16 to 10 MHz. The number of bits for each sample after down-sampling (decimation) must be selected. Simple emulations show that at least 4 bits are enough for effective leakage detection in the cross-correlation receiver.

In a final step 811 (FIG. 13B), an OFDM signature is assembled in a data packet for transmission to leakage detector 102. This data packet includes: (1) LO frequency for zero IF down-conversion of leakage signal; (2) a time-stamp Tx for triggering the cross-correlation process; (3) period of PLC signal; and (4) a data packet with reference samples for cross-correlation with leakage signal samples. Most of the data of the data packet will be reference samples. Consider an example for detection of an 8K OFDM signal with a maximum PLC preamble duration (FIG. 2), where the number of symbols is M=8. Also, assume a 3 MHz baseband at the output of the down-converter (FIG. 16, 1112), a 12.8 MHz clock for the cross-correlation processor (FIG. 16, 1114), and the cyclic prefix has a maximum number of samples at a 204.8 MHz master clock rate, Ncp=1024 (Tcp=5 microseconds). The total number of time domain samples, after decimation by 16 to a 12.8 MHz clock rate, will be:

$$L=[(8\times8182)+(7\times1024)]/16=4544.$$

This is less then 2.3 kB for 4 bit samples. Obviously, the full data packet with LO frequency, timestamp, preamble period, and reference samples will be within only 3 kB. Generally, there is no problem in transmitting such a data packet via a modern 3G/4G wireless network. For example, the same data packet size is currently transmitted twice per second in the QAM Snare® system (www.arcomdigital.com), from a remote server to a number of field leakage detectors and the system works well.

Referring now to FIG. 16, a detailed block diagram of field leakage detector 102 (FIG. 1) is shown. The digital cross-correlation leakage receiver 109 of detector 102 includes a preselector filter 1110, a low noise amplifier (LNA) 1111, a zero IF quadrature down-converter 1112, a dual channel analog-to-digital (A/D) converter 1113, an in-phase and quadrature cross-correlation processor 1114, a local timer unit 1105, and a local oscillator 1108. At the input of preselector filter 1110 is a leakage antenna 1109. Detector 102 also includes a computer or digital controller (CPU) 1103 with an associated flash. memory 1104 and a display 1115. Detector 102 further includes a GPS time sync module 1106, a GPS antenna 1107 connected to module 1106, a wireless modem 1102, and a wireless antenna 1101 connected to modem 1102. After CPU 1103 is switched ON, it connects to, via wireless modem 1102 and antenna 1101, leakage data server 101 (FIG. 1). Server 101 responds by sending to detector 102 data packets of signatures of the OFDM signals. The signatures are received at modem 1102, transferred to CPU 1103, and then stored in flash memory 1104. Also received from server 101 and stored in flash memory 1104 is boundary or location information about the different areas 105 serviced by different CMTS's 104. The boundary or location information is uploaded into flash memory 1104 during an initial period when detector 102 prepares for operation within HFC network 103. The boundary or location information may be periodically updated via wireless modem 1102 from server 101. Thus, when detector 102 is switched OFF and then later, on another work day, it is switched back ON, the signatures will already be present in flash memory 1104, making it unnecessary to call for the signatures again from server 101.

With further reference to FIG. 16, CPU 1103 receives OPS coordinates of detector 102's current position from GPS time sync module 1106, compares those coordinates with predefined boundary coordinates of service areas 105, and then selects a signature based on the service area in which detector 102 is currently located. Then, CPU 1103 transfers timestamp Tx and the PLC signal period Tplc from the selected signature to local timer 1105. Local timer 1105 uses the clock from GPS module 1106. Local timer 1105 also receives National Marine Electronics Association (NMEA) data from module 1106. Thus, local timer 1105 is strongly synchronized with GPS global time. After receiving timestamp Tx and the PLC signal period Tplc, local timer 1105 re-generates Tx every period Tplc to produce a triggering pulse Txi (every period Tplc), for cross-correlation processor 1114. Triggering pulses Txi are formed each moment when Txi=(Tx+(i×Tplc)), where "i" is an integer.

With further reference to FIG. 16, CPU 1103 controls the LO frequency of local oscillator 1108. CPU 1103 programs or sets the LO frequency of local oscillator 1108 to the LO frequency received from the currently selected signature. The off-air OFDM leakage signal is received by antenna 1109, then passes through preselector filter 1110, is amplified by LNA 1111, and then enters down-converter 1112. Local oscillator 1108 is connected to down-converter 1112 and provides down-converter 1112 with the LO signal for down-conversion of the RF OFDM leakage signal to the baseband OFDM leakage signal. Filtered in-phase (I) and quadrature (Q) components of the baseband OFDM leakage signal are digitized in A/I) converter 1113. The digitized I and Q component signals are then received by I and Q branches, respectively, of cross-correlation processor 1114. Processor 1114 is implemented in a field programmable gate array (FPGA). Processor 1114, local oscillator 1108, and local timer 1105 all use the same common GPS clock signal from GPS module 1106. Processor 1114 is triggered by pulses Txi from local timer 1105. Processor 1114 calculates a cross-correlation function representing the cross-correlation of the baseband leakage signal (both I and Q components) with the reference samples from the current OFDM signature (selected by CPU 1103 based on the current position of detector 102). An example of a cross-correlation calculation is disclosed in U.S. Pat. No. 8,456,530 (FIG. 8 and accompanying description). An example of a cross-correlation function is shown here in FIG. 17 (bottom diagram). If a peak of the cross-correlation function exceeds some threshold level (see FIGS. 17, 1208 & 1210), then CPU 1103 makes a decision that a leak has been detected. The results of leakage detection, including but not limited to the cross-correlation function, are displayed on display 1115. Periodically, CPU 1103 sends reports of leakage detection results to server 101 via wireless modem 1102.

Referring now to FIG. 17, there is shown a series of time diagrams illustrating cross-correlation leakage detection and time delay measurement in processor 1114. A OFDM signal 1201 is formed by a CMTS and presented at an output of the CMTS at a moment in time Txi 1207 (first time diagram). Signal 1201 has M number of symbols. Signal 1201 has a duration of M number of symbols with cyclic prefixes. Eight of the symbols are associated with the PLC preamble and PLC subcarriers and the remaining symbols (M-8) are associated with the predefined continuous pilot subcarriers. Signal 1201 travels through HFC network 103 and is leaked from network 103 at some point in the coaxial cable portion of network 103. Signal 1201 then travels off-air and is received by leakage detector 102 (FIG. 16). Signal 1201 appears at the input of leakage detector 102 after a time delay T. This delayed signal is shown in the second time diagram of FIG. 17, as a leakage signal 1202. Notice from the second time diagram that signal 1202 has shifted in time by a time delay T relative to signal 1201. Time delay T represents the propagation time of signal 1201 from its originating CMTS 104 to the leak point in HFC network 103, plus the off-air propagation time from the leak to leak detector 102.

Referring now to the third time diagram in FIG. 17, at moment Txi 1207, processor 1114 starts to calculate the cross-correlation function between samples of leakage signal 1202 and reference samples 1203 of a signature (obtained from CPU 1103). This time diagram shows the actual initial alignment (in time) of reference samples 1203 relative to the samples of leakage signal 1202, at the start of the cross-correlation process (Txi 1207). Also shown are delayed versions, 1203', 1203" and 1203''', of reference samples 1203. These delayed versions represent reference samples 1203 delayed by different delay steps (or "channels") in the cross-correlation performed by processor 1114. The delay steps can be defined as n/F, for n=0 to N, where F is preferably the frequency of the common GPS clock used in processor 1114. For a 3 MHz baseband leakage signal at the output of down-converter 1112, F is preferably chosen to be 12.8 MHz (as previously discussed). Version 1203' represents reference samples 1203 delayed by a delay "x" (or n/F). Version 1203" represents reference samples 1203 delayed by a delay T for purposes of illustration (T being the propagation delay of signal 1202). Lastly, version 1203''' represents reference samples 1203 delayed by 800 microseconds, which is the maximum delay step in the cross-correlation (or N/F). The maximum delay step is chosen to be 800 microseconds because this delay is generally understood to be the maximum allowed time delay of a signal between a CMTS and a cable modem in an HFC network.

In practice, however, the actual time delay between a CMTS and a cable modem is much less than 800 microseconds. Thus, the selection of 800 microseconds, as a maximum delay, substantially ensures that leakage signal 1202 will be detected in the cross-correlation.

Referring now to the fourth time diagram in FIG. 17, there is shown a cross-correlation function 1206 containing a peak 1208. Function 1206 is the result of a coherent cross-correlation between reference samples 1203 and coherently generated samples of baseband leakage signal 1202. In this embodiment, the cross-correlation is considered coherent because (1) the cross-correlation process is started at Txi, which is derived from and synchronized with a CMTS timestamp (Tcmts) on a periodic basis (e.g., once per day, as previously described), and (2) both sets of samples (reference and baseband leakage signal samples) are created at the same sample rate using clocks that are synchronized to a common standard clock (e.g., GPS clock). Looking again at FIG. 17, if peak 1208 exceeds a threshold 1210, then CPU 1103 makes a decision that leak signal 1202 has been detected. CPU 1103 then measures a time delay (e.g., time delay T in FIG. 17) associated with signal 1202 based on the position of peak 1208 relative to a zero point 1209 of function 1206. Zero point 1209 corresponds to the start moment Txi of triggering processor 1114. Zero point 1209 appears just after the accumulation of reference samples 1203, as shown by a vertical dotted line 1211, between the third and fourth. time diagrams. in this way, the center of peak 1208 appears at time delay T (i.e., total propagation delay of signal 1202), measured relative to zero point 1209.

The measured time delay T, along with at least two other time delays measured at two other different geographic coordinate positions of leakage detector 102, are then used to locate the source of the leak by employing a TDOA algorithm. Location of the leak may also be accomplished by the network database method, in which case only a single time delay (e.g., time delay T in FIG. 17) is required. Both methods of leakage location are disclosed in U.S. Pat. No. 8,456,530, which is incorporated herein by reference.

In the case where the CMTS's 104 does not generate a timestamp (Tcmts), the moment of starting the triggering of processor 1114 may be arbitrarily selected, but the period of triggering should match or be equal to the period of the signal used for leakage detection. In one example, the signal is the PLC signal and the period should be equal to the PLC period Tplc. Recall, Tplc=(2560 microseconds+128 Tcp) for 4K FFT mode and (5120 microseconds +128 Tcp) for 8K FFT mode. Also, the cross-correlation function must be calculated over the full PLC period Tplc, not just a maximum time delay of a signal propagating through HFC network 103 (e.g., 800 microseconds) as in FIG. 17. Extending the cross-correlation to the full PLC period will, in most cases, ensure that any delayed leak signal will be detected (during the PLC period). It is possible, in some cases, that the triggering moment will occur in the middle of receiving a leak signal (PLC signal), but this is not very likely. Even in such a worse case, the peak of the cross-correlation function would be reduced, at most, by 6 dB.

In the above case where a timestamp is not generated by the CMTS's, the actual time delay T of signal 1202 is not measured, but the peak of the cross-correlation function will appear at a particular point in the function for a particular geographic location of leakage detector 102. As leakage detector 102 moves to a new geographic location and detects leakage signal 1202 at the new position, the point at which the cross-correlation peak appears is likely to change, representing a relative change in time delay of the signal. This relative change makes it possible to calculate time differences of arrival of the leakage signal. Thus, a TDOA algorithm is suited for determining the location of the leak in this case.

In an alternative embodiment, the cross-correlation calculation can be performed in the frequency domain by a multiplication operation (as is well-known in the art), where the time delay (of the OFDM leakage signal) can be directly obtained from the result. Alternatively, the frequency domain result can be converted back into the time domain by an Inverse Fast Fourier Transform (IFFT) operation to construct the cross-correlation function. For the purposes of this description and the claims, the term "cross-correlation" is intended to encompass (without limitation) both the time domain and frequency domain approaches discussed herein.

To increase the sensitivity of detection of an OFDM leakage signal, processor 1114 coherently accumulates a number (N) of signal pulses (over N Tplc periods) from the M symbols in the leakage signal used for leakage detection (FIG. 17). For example, if processor 1114 accumulates N=16 signal pulses from the M symbols (i.e., the symbols are accumulated 16 times), then this would increase the sensitivity of detection by approximately 12 dB. The number N of accumulations presently contemplated is 16, 32 or more. Coherent accumulation of signal samples or pulses in a cross-correlation processor for leakage detection is described in detail in. U.S. Patent 8,456,530 (see column 16, lines 8-32; FIG. 8; and column 23, line 54 to column 24, line 9).

The above embodiments of the present invention primarily concern the scenario where a service vehicle equipped with a leakage detector patrols the different CMTS service areas. However, there is second scenario to consider. It concerns the final pinpointing of the leak, where a technician leaves the service vehicle with a leakage level meter and ultimately walks to the leak, guided by the readings of the meter. In this second scenario, it is difficult to use time delay to search for a leak, because of the typically short distances to the leaks and the normal drift of the synchronizing reference clock during the search. Thus, an alternative embodiment has been devised, which uses a directional antenna and a leakage level meter. In this embodiment, the cross-correlation processing involves a single (or a few) pilot subcarrier(s) and the processing is done in the frequency domain. The meter may be configured as shown in FIG. 16, except that leakage antenna 1109 is specified as a directional antenna and cross-correlation processor 1114 may be specified to perform the cross-correlation in the frequency domain. More specifically, in this embodiment, processor 1114 performs a fast Fourier transform (FFT) function, a spectrum multiplication function, and an inverse fast Fourier transform (IFFT) function. These functions, in this order, carry out an operation equivalent to a cross-correlation in the time domain. Processor 1114 is implemented using a FPGA. Thus, the FPGA can be easily re-programmed to implement the FFT, multiplication, and IFFT functions for this embodiment.

In the above alternative embodiment, the leakage signal to be detected (signal 1202) is a pilot subcarrier or a few pilot subcarriers of an OFDM signal. The OFDM signatures created by server 101 comprise the same pilot subcarrier or few pilot subcarriers. The signatures include reference samples of the pilot subcarrier signal(s). The leakage signal is received, down-converted, and digitized in the same way as described with respect to the original embodiment and FIG. 16. The signatures (including reference samples) are stored in the leakage level meter in the same manner as described with respect to the original embodiment. The leakage samples and reference samples are then received by re-configured processor 1114, where the frequency spectrums of both are calculated under the FFT function. The spectrums are then multiplied together under the spectrum multiplication function, and the result is converted to the time domain under the IFFT function. The result is equivalent to the cross-correlation function shown in FIG. 17.

A variation of the above alternative embodiment is simply to re-configure processor 1114 as an FFT processor, where the spectrum of the leakage signal is calculated and then analyzed in CPU 1103. In this variation, the leakage signal, again, would be a single or few pilot subcarriers. In this variation, the spectrum would be a priori known by CPU 1103, and thus if the leakage signal spectrum matched the known spectrum, a decision would be made that the leakage signal was detected. Once this is decided, the amplitude of the spectral components of the leakage signal are measured to provide a level reading. Calculating an ITT for a single or few subcarrier(s) allows for a dramatically reduced bandwidth of the receiver channel, from a few MHz to a few kHz. The reduced bandwidth would also increase immunity from interfering signals. For leak detection validation, it is enough to know the center frequency of the pilot subcarrier(s) and/or its offset from a next pilot subcarrier or adjacent pilot subcarriers. A pilot subcarrier is chosen here because it is boosted by 6 dB (as previously discussed), it is continuously present in each symbol, it has a stable initial phase in each symbol, and its spectrum has a discrete and stable form. These factors allow for effective detection and identification by CPU 1103. It should be noted that accurate triggering time (such as with Txi) is not needed. Thus, the design of the leakage level meter can be simple and low cost.

In the case where the pilot subcarriers are stable and fixed within a CMTS service area, the center frequencies of the pilot subcarriers may be pre-programmed in CPU 1103. This would further simplify the meter design by eliminating wireless communications (i.e., wireless modem 1102) with a data server. This simplification would further reduce the cost of the meter, making it even more suitable for a home installer/home certification application.

While the preferred embodiments of the invention have been particularly described in the specification and illustrated in the drawing, it should be understood that the invention is not so limited. Many modifications, equivalents and adaptations of the invention will become apparent to those skilled in the art without departing from the spirit and scope of the invention, as defined in the appended claims.

What is claimed is:

1. A method of detecting a leak in a hybrid fiber-coax (HFC) network, the HFC network transmitting a plurality of orthogonal frequency division multiplexing (OFDM) signals to a plurality of service areas, respectively, each of the OFDM signals being characterized by a signal period synchronized to a standard reference clock and being represented by a pre-constructed signature including signal samples created at a first sample rate, each of the service areas being defined by geographic coordinates, the leak being located in one of the service areas and emitting one of the OFDM signals over-the-air as an OFDM leakage signal, said method comprising the steps of:
   (a) moving through the service areas of the HFC network;
   (b) receiving the OFDM leakage signal over-the-air at a detection point;
   (c) generating signal samples of the received OFDM leakage signal at the first sample rate using a clock signal substantially synchronized to the standard reference clock;
   (d) determining a geographic position of the detection point;
   (e) determining in which of the service areas the detection point is located based on the geographic position of the detection point and the geographic coordinates of the service areas;
   (f) selecting one of the signatures based at least on the service area in which the detection point is located;
   (g) creating a series of triggering pulses having a period substantially synchronized to the standard reference clock and to the signal period of the OFDM signal represented by the selected signature;
   (h) upon a trigger from one of the triggering pulses, performing a cross-correlation between the signal samples of the selected signature and the signal samples of the received OFDM leakage signal, the cross-correlation producing a cross-correlation function having a peak characterized by a peak level, the cross-correlation being performed using a clock signal substantially synchronized to the standard reference clock and having a frequency equal to the first sample rate; and
   (i) determining whether the OFDM leakage signal has been detected based on the peak level of the cross-correlation function.

2. The method of claim 1, wherein each of the signatures includes a triggering timestamp synchronized to the standard reference clock, and wherein step (g) includes creating the series of triggering pulses from the triggering timestamp.

3. The method of claim 1, wherein the OFDM leakage signal includes an actual Physical layer Link Channel (PLC) signal and the selected signature includes a constructed PLC signal corresponding to the actual PLC signal, the signal samples of the selected signature including signal samples of the constructed PLC signal and the signal samples of the received OFDM leakage signal including signal samples of the actual PLC signal, and wherein step (h) includes performing a cross-correlation between the signal samples of the constructed PLC signal and the signal samples of the actual PLC signal.

4. The method of claim 1, wherein—
   the selected signature includes signal samples of a constructed baseband version of the OFDM leakage signal,
   step (b) includes down-converting the received OFDM leakage signal to an actual baseband version of the OFDM leakage signal,
   step (c) includes generating signal samples of the actual baseband version of the received OFDM leakage signal, and
   step (h) includes performing a cross-correlation between the signal samples of the constructed baseband version of the OFDM leakage signal and the signal samples of the actual baseband version of the received OFDM leakage signal.

5. The method of claim 1, wherein step (f) includes selecting one of the signatures based further on the geographic position of the detection point.

6. The method of claim 1, further comprising the step of determining the level of the received OFDM leakage signal from the peak level of the cross-correlation function.

7. The method of claim 1, further comprising the step of determining a time delay associated with the received OFDM leakage signal from a position of the peak in the cross-correlation function.

8. A system for detecting a leak in a hybrid fiber-coax (HFC) network, the HFC network transmitting a plurality of orthogonal frequency division multiplexing (OFDM) signals to a plurality of services areas, respectively, each of the OFDM signals being characterized by a signal period that is synchronized to a standard reference clock, each of the service areas being defined by geographic coordinates, the leak being located in one of the service areas and emitting one of the OFDM signals over-the-air as an OFDM leakage signal, said system comprising:
 (a) a leakage data server containing a plurality of signatures associated with the plurality of OFDM signals, respectively, each signature including
  the signal period of the associated OFDM signal, and
  signal samples representing the associated OFDM signal and generated at a first sample rate; and
 (b) a leakage detector to be moved through the service areas of the HFC network, said leakage detector including—
  (i) a wireless modem for receiving, via a wireless network, the plurality of signatures from said leakage data server,
  (ii) a leakage signal receiver for receiving the OFDM leakage signal over the air,
  (iii) an analog-to-digital converter, coupled to the leakage signal receiver, for generating signal samples of the received OFDM leakage signal at the first sample rate, using a clock signal substantially synchronized to the standard reference clock,
  (iv) a global positioning system (GPS) receiver for determining a geographic position of said leakage detector,
  (v) a digital controller coupled to the GPS receiver and the wireless modem and configured to determine in which of the service areas said leakage detector is located based on the geographic position of said leakage detector and on the geographic coordinates of the service areas, the digital controller being further configured to select one of the signatures based at least on the service area in which said leakage detector is located,
  (vi) a local timer, coupled to the GPS receiver and the digital controller, for generating a series of triggering pulses having a period substantially synchronized to the signal period of the OFDM signal associated with the selected signature, and
  (vii) a cross-correlation processor, coupled to the analog-to-digital converter, to the digital controller, and to the local timer, for cross-correlating the signal samples of the selected signature with the signal samples of the received OFDM leakage signal, to produce a cross-correlation function having a peak, the cross-correlation processor being triggered by the series of triggering pulses generated by the local timer and performing the cross-correlation using a clock signal substantially synchronized to the standard reference clock and having a frequency equal to the first sample rate,
  whereby the OFDM leakage signal is detected from the peak of the cross-correlation function.

9. The system of claim 8, wherein each signature further includes a triggering timestamp synchronized to the standard reference clock, and wherein the local timer generates the series of triggering pulses from the triggering timestamp of the selected signature.

10. The system of claim 9, wherein the triggering timestamp of each signature is derived from a timestamp associated with the OFDM signal with which the signature is associated.

11. The system of claim 8, wherein the OFDM leakage signal includes an actual Physical layer Link Channel (PLC) preamble signal, the signal samples of the selected signature including signal samples representing the actual PLC preamble signal, and the signals samples of the received OFDM leakage signal including signal samples of the actual PLC preamble signal.

12. The system of claim 8, wherein the signal samples of the selected signature represents a baseband version of the OFDM leakage signal, the leakage signal receiver further including a down-converter for converting the received OFDM leakage signal to a baseband version of the OFDM leakage signal, and wherein the signal samples generated by the analog-to-digital converter are samples of the baseband version of the received OFDM leakage signal.

13. The system of claim 8, wherein the digital controller is configured to select one of the signatures based further on the geographic position of said leakage detector.

14. The system of claim 8, wherein the digital controller is further configured to determine a time delay associated with the received OFDM leakage signal from a position of the peak in the cross-correlation function.

15. A leakage detector for detecting a leak in a hybrid fiber-coax (HFC) network, the HFC network transmitting a plurality of orthogonal frequency division multiplexing (OFDM) signals to a plurality of services areas, respectively, each of the OFDM signals being characterized by a signal period synchronized to a standard reference clock and being represented by a pre-constructed signature including signal samples created at a first sample rate, each of the service areas being defined by geographic coordinates, the leak being located in one of the service areas and emitting one of the OFDM signals over-the-air as an OFDM leakage signal, said leakage detector comprising:
 (a) a leakage signal receiver for receiving the OFDM leakage signal over-the-air at a detection point in one of the service areas of the HFC network;
 (b) an analog-to-digital converter, coupled to said leakage signal receiver, for generating signal samples of the received OFDM leakage signal at the first sample rate, using a clock signal substantially synchronized to the standard reference clock;
 (c) a global positioning system (GPS) receiver for determining a geographic position of the detection point;
 (d) a digital controller coupled to said GPS receiver and configured to determine in which of the service areas the detection point is located based on the geographic position of the detection point and the geographic coordinates of the service areas, the digital controller being further configured to select one of the signatures based at least on the service area in which the detection point is located;
 (e) a local timer, coupled to said GPS receiver and said digital controller, for creating a series of triggering pulses having a period substantially synchronized to the signal period of the OFDM signal represented by the selected signature; and
 (g) a cross-correlation processor, coupled to said analog-to-digital converter, to said digital controller, and to said local timer, for cross-correlating the signal samples of the selected signature with the signal samples of the received OFDM leakage signal, to produce a cross-correlation function having a peak, the cross-correlation processor being triggered by the series of triggering pulses created by the local timer and performing the cross-correlation using a clock signal substantially synchronized to the standard reference clock and having a frequency equal to the first sample rate, whereby the OFDM leakage signal is detected from the peak of the cross-correlation function.

16. The leakage detector of claim 15, wherein the signal samples of the selected signature represents a baseband version of the OFDM leakage signal, said leakage signal receiver further including a down-converter for converting the received OFDM leakage signal to a baseband version of the OFDM leakage signal, and wherein the signal samples generated by the analog-to-digital converter are samples of the baseband version of the received OFDM leakage signal.

* * * * *